(12) United States Patent
LaRue et al.

(10) Patent No.: US 6,401,104 B1
(45) Date of Patent: Jun. 4, 2002

(54) SYSTEM AND METHODS FOR SYNCHRONIZING DATASETS USING COOPERATION AMONG MULTIPLE SYNCHRONIZATION ENGINES

(75) Inventors: Chris LaRue, Santa Cruz; Bryan Dube, Scotts Valley, both of CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/347,447

(22) Filed: Jul. 3, 1999

(51) Int. Cl.[7] .............................................. G06F 12/00
(52) U.S. Cl. ...................... 707/203; 707/200; 707/201; 707/202; 707/204
(58) Field of Search ................................ 707/200–204

(56) References Cited

U.S. PATENT DOCUMENTS

| | | |
|---|---|---|
| 4,769,796 A | 9/1988 | Levine |
| 4,866,611 A | 9/1989 | Cree et al. |
| 4,881,179 A | 11/1989 | Vincent |
| 4,977,520 A | 12/1990 | McGaughey, III et al. |
| 5,047,918 A * | 9/1991 | Schwartz .................... 364/200 |
| 5,113,380 A | 5/1992 | Levine |
| 5,224,212 A | 6/1993 | Rosenthal et al. |
| 5,390,320 A | 2/1995 | Smithline |
| 5,392,390 A | 2/1995 | Crozier |
| 5,442,783 A | 8/1995 | Oswald et al. |
| 5,519,606 A | 5/1996 | Frid-Nielsen et al. |
| 5,666,530 A | 9/1997 | Clarke et al. |
| 5,666,553 A | 9/1997 | Crozier |
| 5,684,990 A | 11/1997 | Boothby |
| 5,701,423 A | 12/1997 | Crozier |
| 5,706,509 A | 1/1998 | Tso |
| 5,710,922 A | 1/1998 | Alley et al. |
| 5,727,202 A | 3/1998 | Kucala |
| 5,729,735 A | 3/1998 | Meyering |
| 5,758,150 A | 5/1998 | Bell et al. |
| 5,758,355 A | 5/1998 | Buchanan |
| 5,761,667 A | 6/1998 | Koeppen |
| 5,778,346 A | 7/1998 | Frid-Nielsen et al. |
| 5,778,389 A | 7/1998 | Pruett et al. |
| 5,813,009 A | 9/1998 | Johnson et al. |
| 5,832,487 A | 11/1998 | Olds et al. |
| 5,845,293 A * | 12/1998 | Veghte et al. ............... 707/202 |
| 5,884,323 A | 3/1999 | Hawkins et al. |
| 5,913,214 A | 6/1999 | Madnick et al. |
| 5,926,816 A | 7/1999 | Bauer et al. |
| 5,974,238 A | 10/1999 | Chase, Jr. |
| 5,978,804 A | 11/1999 | Dietzman |
| 6,044,381 A * | 3/2000 | Boothby et al. ............ 707/201 |

* cited by examiner

*Primary Examiner*—Hosain T. Alam
*Assistant Examiner*—Cam Y T Truong
(74) *Attorney, Agent, or Firm*—C. George Yu; Darryl A. Smith

(57) ABSTRACT

A system and methods for synchronizing datasets are provided that are especially suitable and efficient for a user who has three or more datasets that need to be occasionally synchronized, with no one dataset or synchronization system being guaranteed to participate in every synchronization. Synchronization status information, such as correspondences between data records of particular multiple datasets, is stored with more than one of the datasets. When two datasets that contain synchronization status information synchronize with each other, they not only synchronize user data and exchange status information involving each other, but they also synchronize and exchange status information involving "third-party" datasets that may not be participating in the synchronization. In this way, synchronization status information collected in an earlier synchronization is made available in a later synchronization, even if the earlier and later synchronizations are not conducted by a same synchronization system or do not both include a common, permanently designated "hub" dataset. Further, when datasets being synchronized are found to contain mutually-duplicative data records, the data records are intelligently mapped to each other as being corresponding so as to avoid or minimize causing of changes to be made, in the data records, that would make synchronization status information stored in another dataset to become obsolete.

31 Claims, 18 Drawing Sheets

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}$ = VAL | STATUS $ID_{INT} : T_{MOD}$ | DATA $ID_{INT}$ = VAL | STATUS $ID_{INT} : T_{MOD}, T_{PRI}$ ~$ID_{EXT}, T_{SYNC}$ | DATA $ID_{INT}$ = VAL | STATUS $ID_{INT} : T_{MOD}, T_{PRI}$ ~$ID_{EXT}, T_{SYNC}$ |
| T0 | | | | | | |
| T1 (USER ADD) | A3=X | A3:T1 | | | | |
| T2 (A-B SYNC) | " | " | B9=X | B9: T2, T1 ~A3, T2 | | |
| T3 (B-C SYNC) IF DO NOT SHARE 3RD-PARTY INFO | " | " | " | B9: T2, T1 ~A3, T2 ~C5, T3 | C5=X | C5: T3, T1 ~B9, T3 |
| T3 (B-C SYNC) IF DO SHARE 3RD-PARTY INFO | " | " | " | B9: T2, T1 ~A3, T2 ~C5, T3 | C5=X | C5: T3, T1 ~B9, T3 ~A3, T2/T-∞, FRSH |
| T4 (A-C SYNC) IF DID NOT SHARE 3RD-PARTY INFO | | | (VARIOUS SUB-OPTIMAL RESULTS ARE POSSIBLE) | | | |
| T4 (A-C SYNC) IF DID SHARE 3RD-PARTY INFO | A3=X | A3:T1 | B9=X | B9: T2, T1 ~A3, T2 ~C5, T3 | C5=X | C5: T3, T1 ~B9, T3 ~A3, T4, FRSH |

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}$ = VAL | STATUS $ID_{INT}$ : $T_{MOD}$ | DATA $ID_{INT}$ = VAL | STATUS $ID_{INT}$ : $T_{MOD}$ , $T_{PRI}$ ~ $ID_{EXT}$, $T_{SYNC}$ | DATA $ID_{INT}$ = VAL | STATUS $ID_{INT}$ : $T_{MOD}$ , $T_{PRI}$ ~ $ID_{EXT}$, $T_{SYNC}$ |
| T0 | | | | | | |
| T1 (USER ADD) | A3=X | A3:T1 | | | | |
| T2 (A-B SYNC) | " | " | B9=X | B9: T2, T1 ~ A3, T2 | | |
| T3 (A-C SYNC) | " | " | " | " | C5=X | C5: T3, T1 ~ A3, T3 |
| T4 (B-C SYNC) IF DO NOT SHARE 3RD-PARTY INFO | A3=X | A3:T1 | (VARIOUS SUB-OPTIMAL RESULTS ARE POSSIBLE) | | | |
| T4 (B-C SYNC) IF DO SHARE 3RD-PARTY INFO | A3=X | A3:T1 | B9=X | B9: T2, T1 ~ A3, T3/T2 ~ C5, T4 | C5=X | C5: T3, T1 ~ A3, T3 ~ B9, T4 |

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}$ = VAL | STATUS $ID_{INT}$ : $T_{MOD}$ | DATA $ID_{INT}$ = VAL | STATUS $ID_{INT}$ : $T_{MOD}$, $T_{PRI}$ ~ $ID_{EXT}$, $T_{SYNC}$ | DATA $ID_{INT}$ = VAL | STATUS $ID_{INT}$ : $T_{MOD}$, $T_{PRI}$ ~ $ID_{EXT}$, $T_{SYNC}$ |
| T0 | | | | | | |
| T1 (USER ADD) — 633 | A3=X | A3:T1 | | | | |
| T2 (A-B SYNC) — 635 | " | " | B9=X | B9: T2, T1 ~ A3, T2 | | |
| T2.5 (USER MOD) — 636 | A3=Y | A3:T2.5 | " | " | | |
| T3 (A-C SYNC) — 637A | " | " | " | " | C5=Y | C5: T3, T2.5 ~ A3, T3 |
| T4 (B-C SYNC) IF DO NOT SHARE 3RD-PARTY INFO — 639A | A3=Y | A3:T2.5 | | | | |
| (VARIOUS SUB-OPTIMAL RESULTS ARE POSSIBLE) | | | | | | |
| T4 (B-C SYNC) IF DO SHARE 3RD-PARTY INFO — 641A | A3=Y | A3:T2.5 | *B9=Y* | B9: T4, T2.5 ~ A3, *T3/T2, FRSH* ~ *C5, T4* | *C5=Y* | C5: T3, T2.5 ~ A3, T3 ~ *B9, T4* |

FIG. 6C

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}$ = VAL | STATUS $ID_{INT}: T_{MOD}$ | DATA $ID_{INT}$ = VAL | STATUS $ID_{INT}: T_{MOD}, T_{PRI}$ ~ $ID_{EXT}, T_{SYNC}$ | DATA $ID_{INT}$ = VAL | STATUS $ID_{INT}: T_{MOD}, T_{PRI}$ ~ $ID_{EXT}, T_{SYNC}$ |
| T1 (USER ADD) | | | B9=X | B9: T2, T1 | | |
| T2 (B-C SYNC) (NO 3RD-PARTY INFO) | | | " | B9: T2, T1 ~C5, T2 | C5=X | C5: T2, T1 ~B9, T2 |
| T3 (A-B SYNC) (DATASET A CANNOT TAKE 3RD-PARTY INFO) | A3=X | A3:T3 | " | B9: T2, T1 ~C5, T2 ~A3, T3 | " | " |
| T4 (B-C SYNC) IF DO NOT SHARE 3RD-PARTY INFO | " | " | " | " | " | " |
| T4 (B-C SYNC) IF DO SHARE 3RD-PARTY INFO | " | " | " | " | " | C5: T2, T1 ~B9, T2 ~A3, T3/T-∞ |
| T5 (A-C SYNC) IF DID NOT SHARE 3RD-PARTY INFO | A3=X | A3:T1 | B9=X | B9: T2, T1 ~A3, T2 ~C5, T3 | (VARIOUS SUB-OPTIMAL RESULTS ARE POSSIBLE) | |
| T5 (A-C SYNC) IF DID SHARE 3RD-PARTY INFO | " | " | " | " | C5=X | C5: T3, T1 ~B9, T3 ~A3, T5 |

FIG. 6D 653, 657, 659, 661, 663, 665, 667

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}$ = VAL | STATUS $ID_{INT}:T_{MOD}$ | DATA $ID_{INT}$ = VAL | STATUS $ID_{INT}:T_{MOD},T_{PRI}$ ~ $ID_{EXT},T_{SYNC}$ | DATA $ID_{INT}$ = VAL | STATUS $ID_{INT}:T_{MOD},T_{PRI}$ ~ $ID_{EXT},T_{SYNC}$ |
| T0 | | | | | | |
| T1 (USER ADD) | A3=X | A3:T1 | | | | |
| T2 (A-B SYNC) | " | " | B9=X | B9: T2, T1 ~ A3, T2 | | |
| T3 (B-C SYNC) | " | " | " | B9: T2, T1 ~ A3, T2 ~ C5, T3 | C5=X | C5: T3, T1 ~ B9, T3 |
| ... | | | | | | |

800

603 — T1 row
605 — T2 row
607 — T3 row

FIG. 8A

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA | STATUS | DATA | STATUS | DATA | STATUS |
| ... | | | | | | |
| T3 (B-C SYNC) (shown again) | A3=X | A3:T1 | B9=X | B9: T2, T1 ~ A3, T2 ~ C5, T3 | C5=X | C5: T3, T1 ~ B9, T3 |
| T4 (A-C SYNC) IF DUPL. RESOLUTION FAILS COMPLETELY | A3=X A6=X | A3:T1 A6:T4 | " | " | C5=X | C5: T3, T1 ~ B9, T3 ~ A6, T4 C7: T4: T1 ~ A3, T4 |
| T4 (A-C SYNC) IF DUPL. RESOLUTION "SUCCEEDS", C WINS | A3= <del> A6=X | A3:T1 A6:T4 | " | " | C7=X | C5: T3, T1 ~ B9, T3 ~ A6, T4 C7: T4: T1 ~ A3, T4 |
| T4 (A-C SYNC) IF DUPL. RESOLUTION "SUCCEEDS", A WINS | A3=X | A3:T1 | " | " | C5=X | C5: T3, T1 ~ B9, T3 ~ A6, T4 |
| T4 (A-C SYNC) IF USE ENHANCED DUPL. RESOLUTION | A3=X | A3:T1 | " | " | C5= <del> C7=X | C5: T4, T1 ~ B9, T3 C7: T4: T1 ~ A3, T4 |
| | | | | | C5=X | C5: T3, T1 ~ B9, T3 ~ A3, T4 |

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA $ID_{INT}=$ VAL | STATUS $ID_{INT}:T_{MOD}$ | DATA $ID_{INT}=$ VAL | STATUS $ID_{INT}:T_{MOD},T_{PRI}$ $\sim ID_{EXT},T_{SYNC}$ | DATA $ID_{INT}=$ VAL | STATUS $ID_{INT}:T_{MOD},T_{PRI}$ $\sim ID_{EXT},T_{SYNC}$ |
| T0 | | | | | | |
| T1 (USER ADD) | A3=X | A3:T1 | | | | |
| T2 (A-B SYNC) | = | = | B9=X | B9: T2, T1 $\sim$ A3, T2 | | |
| T3 (A-C SYNC) | = | = | = | = | C5=X | C5: T3, T1 $\sim$ A3, T3 |
| ⋮ | | | | | | |

633 ⌙
635 ⌙
637 ⌙

| TIME (INCREASING) | DATASET A (e.g., H-H CLIENT) | | DATASET B (e.g., PC ENGINE'S) | | DATASET C (e.g., SERVER ENGINE'S) | |
|---|---|---|---|---|---|---|
| | DATA | STATUS | DATA | STATUS | DATA | STATUS |
| ... | | | | | | |
| T3 (A-C SYNC) (shown again) | A3=X | A3:T1 | B9=X | B9: T2, T1 ~ A3, T2 | C5=X | C5: T3, T1 ~ A3, T3 |
| T4 (B-C SYNC BY B) IF DUPL. RESOLUTION FAILS COMPLETELY | " | " | B9 =X | B9: T2, T1 ~ A3, T2 B18: T4, T1 ~ C5, T4 | C5=X *C7=X* | C5: T3, T1 ~ A3, T4 ~ B18, T4 C7: T4, T1 ~ B9, T4 |
| T4 (B-C SYNC BY B) IF DUPL. RESOLUTION "SUCCEEDS", C WINS | " | " | B9 = *<del>* *B18=X* | B9: T4, T1 ~ A3, T2 B18: T4, T1 ~ C5, T4 | C5=X | C5: T3, T1 ~ A3, T3 ~ B18, T4 |
| T4 (B-C SYNC BY B) IF DUPL. RESOLUTION "SUCCEEDS", B WINS | " | " | B9=X | B9: T2, T1 ~ A3, T2 ~ C7, T4 | C5= *<del>* *C7=X* | C5: T4, T1 ~ A3, T3 ~ B9, T4 C7: T4, T1 ~ B9, T4 |
| T4 (B-C SYNC BY B) IF USE ENHANCED DUPL. RESOLUTION | " | " | B9=X | B9: T2, T1 ~ A3, T2 ~ *C5, T4* | C5=X | C5: T3, T1 ~ A3, T4 ~ *B9, T4* |

SYSTEM AND METHODS FOR SYNCHRONIZING DATASETS USING COOPERATION AMONG MULTIPLE SYNCHRONIZATION ENGINES

RELATED APPLICATIONS

The present application is related to the following commonly-owned U.S. patent applications, the disclosures of which are hereby incorporated by reference in their entirety, including any appendices or attachments thereof, for all purposes:

Ser. No. 09/311,781, filed May 13, 1999 and entitled System and Methods For Synchronizing Datasets in a Non-FIFO or Otherwise Difficult Communication Environment; (None-patent)

Ser. No. 09/208,815, filed Dec. 8, 1998 and entitled System and Methods for Robust Synchronization of Datasets; (none-patent)

Ser. No. 09/136,215, filed Aug. 18, 1998 and entitled System and Methods for Synchronization Two or More Datasets; (U.S. Pat. No.; 6,295,541)

Ser. No. 09/136,212, filed Aug. 18, 1998 and entitled Data Processing Environment With Methods Providing Contemporaneous Synchronization of Two or More Clients; (U.S. Pat. No.; 6,275,831)

Ser. No. 09/020,047, filed Feb. 6, 1998, and entitled Methods for Mapping Data Fields From One Data Set to Another in a Data Processing Environment; (U.S. Pat. No.; 6,215,131)

Ser. No. 08/923,612, filed Sep. 4, 1997 and entitled System and Methods for Synchronizing Information Among Disparate Datasets; and (none-patent)

Ser. No. 08/693,677, filed Aug. 12, 1996 and entitled Scheduling System With Methods for Peer-To-Peer Scheduling of Remote Users. (U.S. Pat. No.; 6,016,478)

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to synchronization of data—that is, the process of taking two or more separate collections of data ("datasets") and applying changes to one or more of the datasets to make the datasets identical or equivalent. The present invention is particularly relevant to synchronization involving a dataset that may separately synchronize with multiple other datasets at various times, especially if the other datasets may also synchronize with one another.

With each passing day, there is ever increasing need for synchronization solutions for connected information devices. Here, information devices include, for example, general- or special-purpose computers of all types and sizes, Internet or intranet access devices, cellular phones, pagers, and other handheld devices including, for example, the StarTAC® clipOn Organizer, REX PRO™ organizer, Palm organizer, Microsoft "Windows CE" devices, and the like. (StarTAC is a registered trademark of Motorola, Inc. of Schaumburg, Ill. REX and REX PRO are trademarks of Franklin Electronic Publishers of Burlington, N.J. The StarTAC® clipOn Organizer and REX™ and REX PRO™ organizers include licensed technology from Starfish Software, Inc. ("Starfish"), the present assignee. Palm organizers are produced by Palm Computing, Inc., a subsidiary of 3Com Corp. of Santa Clara, Calif. The Windows CE device operating system and other Microsoft software are produced by Microsoft Corporation of Redmond, Wash.).

As the use of information devices is ever growing, users often have their data in more than one device, or in more than one software application. Consider, for instance, a user who has his or her appointments and contacts on a desktop personal computer (PC) at work and also has appointments or contacts on a notebook computer at home and on a battery-powered, handheld device for use in the field. The user is free to alter the information on any one of these devices independently of the other devices. What the user wants is the information in each device to remain synchronized with corresponding information in other devices in a convenient, transparent manner. Further, some devices are connected at least occasionally to a server computer (for example, an Internet server) that stores information for the user. The user would of course like the information on the server computer to participate in synchronization, so that the information on the server computer also remains synchronized.

An early approach to maintaining consistency between datasets was simply to import or copy one dataset on top of another. That simple approach, one which overwrites a target dataset without any attempt at reconciling any differences, is inadequate for all but the simplest of applications. Expectedly, more sophisticated synchronization techniques were developed. In particular, techniques were developed for attempting to reproduce in each dataset the changes made in other dataset(s) since a previous synchronization and resolving any conflicts involving such changes, automatically or with user assistance. Some earlier examples of such synchronization techniques were limited to "point-to-point" synchronization, in which exactly two datasets are synchronized. Later, certain "multi-point" synchronization techniques were developed by Starfish that are capable of synchronizing arbitrarily many datasets using a single synchronization system or in response to a single interaction with a user.

At first, as a typical user first began to accumulate more than two datasets that needed synchronization, he or she typically found that a hub-and-spoke configuration of his or her datasets was sufficient. FIG. 1 illustrates an example 100 of such a hub-and-spoke synchronization configuration for a hub dataset 105 and satellite datasets 110, 115, 120. According to the configuration 100, the hub dataset 105 participates in every synchronization and serves as a central repository of data from all datasets, as known from all synchronizations to date. Any one of the satellite datasets 110, 115, 120 (e.g., synchronization clients) may or may not participate in any particular synchronization, depending for example on availability, user preference, or the capabilities of the synchronization system being used (e.g., point-to-point or multi-point). In the example configuration 100, the hub dataset 105 and the satellite datasets 110, 115, 120 reside, for example, on a PC 140, a first handheld device 145 (e.g., a Palm organizer), an Internet server 150, and a second handheld device 155 (e.g., a StarTAC® clipOn Organizer), respectively. Synchronization paths 125, 130, 135 (e.g., serial cables (e.g., RS-232), infrared connections, the Internet, or the like) connect the datasets as indicated.

A configuration, such as the configuration 100, that has a single, permanently-designated hub dataset is useful for synchronizing the user's datasets, as long as the hub dataset is always available when synchronization is desired. However, as the user accumulates ever more datasets and uses them in ever more contexts, the user increasingly wishes to deviate from such a configuration. In particular, the user wishes to synchronize datasets with one another without requiring that a single permanently-designated hub dataset be available to participate in every synchronization. By wanting to deviate from a rigid hub-and-spoke configuration of the user's datasets, the user introduces additional complexity to the synchronization task. If not understood or handled properly, the additional complexity can cause inefficiencies or even corruption of the user's data.

Consider, for example, a user who formerly used the single permanently-designated hub dataset 105 in all synchronizations as a reference dataset. This user now wishes to occasionally synchronize the formerly permanently-designated satellite datasets 110, 115 directly with one another without participation of the formerly permanently-designated hub dataset 105. In effect, the user wishes to create a circular, or looping, synchronization relationship among the three datasets 105, 110, 115. In this looping relationship, the direct synchronization between the former satellite datasets 110, 115 cannot take advantage of knowledge stored in the former hub dataset 105. Thus, during the direct synchronization not involving the former hub dataset 105, the former satellite datasets 110, 115 may not realize the extent to which they may have already been synchronized by the former hub dataset 105. As a result, the former satellite datasets 110, 115 may needlessly exchange user data that is actually already known to the other side of the communication and thereby waste processing resources and communication bandwidth.

Additionally, the former satellite datasets may fail to realize that certain received user data is already known and therefore redundant. As a result, one or both former satellite datasets may actually treat the received redundant user data as new data to be added locally and thereby corrupt the user data by creating duplicate records. Such possible waste of processing resources and communication resources, and such possible corruption of user data with erroneously duplicated records, can further compound in subsequent synchronizations. This further compounding may occur, for example, in a subsequent synchronization involving the former hub dataset 105. In such a subsequent synchronization, the knowledge within the former hub dataset 105 may no longer be up-to-date, due to changes made to the former satellite datasets 110, 115 during their direct synchronization. As a result, the synchronization involving the former hub dataset 105 may also waste resources or corrupt user data.

In light of problems associated with circular synchronization relationships, such as described above, what is needed are synchronization technologies that can synchronize datasets in a non-single-dedicated-hub configuration, especially a circular configuration, without corrupting user data (once or repeatedly) and without needlessly processing and re-transmitting already-known user data (once or repeatedly). More generally, what is needed are synchronization systems and methods that share and preserve synchronization status information in an intelligent manner so that later synchronizations can more fully take advantage of knowledge gained in earlier synchronizations, even if the earlier and later synchronizations are orchestrated by different synchronization systems or use different reference datasets.

SUMMARY OF THE INVENTION

Embodiments of the present invention include systems and methods for synchronization that are especially suitable and efficient for a user who has three or more datasets that need to be occasionally synchronized, with no one dataset or synchronization system being guaranteed to participate in every synchronization. According to an aspect of the present invention, synchronization status information, such as correspondences between data records of particular multiple datasets, is stored with more than one of the datasets. When two datasets that contain synchronization status information synchronize with each other, they not only exchange status information involving each other and synchronize user data, but they also synchronize and exchange status information involving "third-party" datasets that may not be participating in the synchronization. In this way, synchronization status information collected in an earlier synchronization is made available in a later synchronization, even if the earlier and later synchronizations are not conducted by a same synchronization system or do not both include a common, permanently-designated "hub" dataset. According to another aspect of the invention, when datasets being synchronized are found to contain mutually-duplicative data records, the data records are intelligently mapped to each other as being corresponding so as to avoid or minimize causing of changes to be made, in the data records, that would make synchronization status information stored in another dataset to become obsolete.

In an embodiment of the invention, a method is provided for synchronizing a first dataset with a second dataset in an information processing system. The first and second datasets each includes user data, and the user data of each of the first and second datasets is capable of having been changed independently of the other of the first and second datasets. The method includes a step of maintaining, for the first dataset, information that is descriptive of synchronization between the first dataset and a third dataset. The information may be referred to as the third-party information. The method further includes steps of communicating the third-party information; and synchronizing the first dataset with the second dataset using the communicated third-party information.

BRIEF DESCRIPTION OF THE DRAWINGS

FIGS. 6A–6D include tables that each depicts an example sequence of synchronizations, including results, using the method of FIG. 5 according to the preferred embodiment of the present invention.

FIGS. 8A and 8B form a table that depicts a first example sequence of synchronizations, of FIG. 6A, including possible results of using only the synchronization method of FIG. 7B according to the present invention or of not using the enhancements of the method of FIG. 7B.

FIGS. 8C and 8D form a table that depicts a second example sequence of synchronizations, of FIG. 6B, including possible results of using only the synchronization method of FIG. 7B according to the present invention or of not using the enhancements of the method of FIG. 7B.

DETAILED DESCRIPTION OF SPECIFIC EMBODIMENTS

The following description will focus on the currently-preferred embodiment of the present invention, which is operative in an environment typically including desktop computers, server computers, and portable computing devices, occasionally or permanently connected to one another, in which synchronization support is desired. The present invention, however, is not limited to any particular environment or device. Instead, those skilled in the art will find that the present invention may be advantageously applied to any environment or application in which synchronization among an arbitrary number of datasets, especially three or more datasets, is desirable, especially if no single permanently-designated reference dataset is guaranteed or required to be available during every synchronization. The description of the exemplary embodiments which follows is, therefore, for the purpose of illustration and not limitation.

I. Problems with No Longer Requiring a Permanently-designated Hub Dataset

A. The Baseline Multi-point Hub-and-spoke Synchronizer

Figure 1:
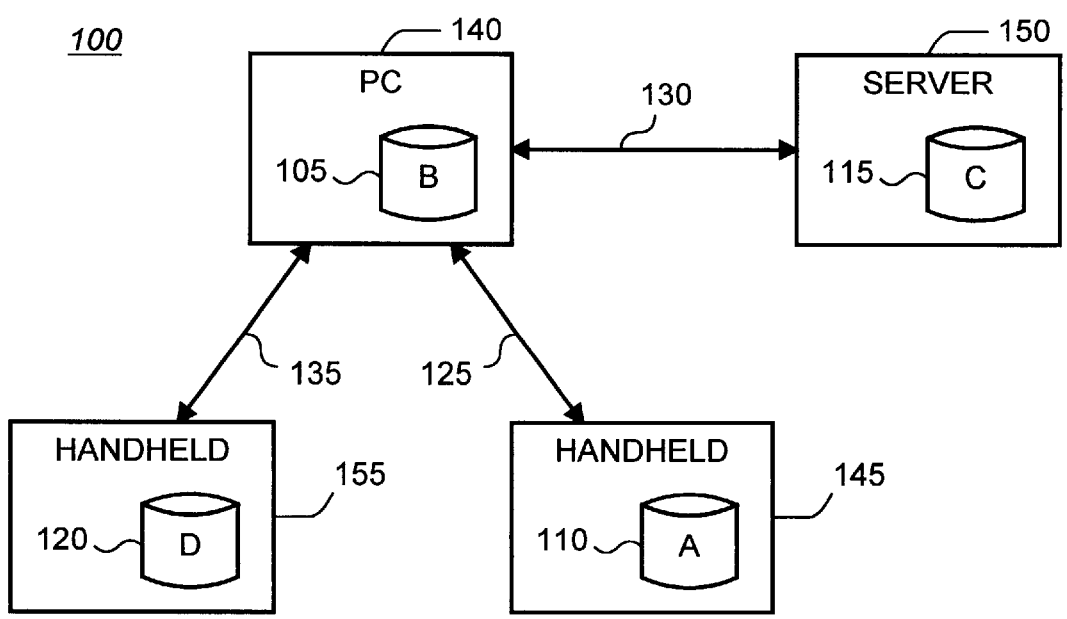
FIG. 1 is a block diagram that shows a hub-and-spoke synchronization configuration, according to the prior art.

The hub-and-spoke synchronization configuration was discussed in the Background section in connection with FIG. 1. A baseline multi-point synchronization system from Starfish uses the hub-and-spoke configuration to good advantage. The baseline Starfish system uses the hub dataset 105 as the system's reference dataset or "Grand Unified Dataset" (GUD). The baseline Starfish system stores into the hub dataset 105 not only the latest user data but also status information about such user data relating to all datasets of the hub-and-spoke configuration. The status information includes, for example, information regarding the last-known correspondences of individual records across all datasets ("record mapping information") and information regarding the last-known versions of records (e.g., last-synchronization timestamps) in each and every dataset. The baseline Starfish system uses the status information in the hub dataset to make synchronizations efficient. Using the baseline Starfish system under the exclusively hub-and-spoke configuration, every synchronization involving any dataset can take advantage of all knowledge gained from all previous synchronizations involving any dataset, so long as such knowledge is among the data or status information dutifully recorded into the hub dataset 105 by the system.

B. The Problematic Circular Synchronization Configuration

Figure 2A:
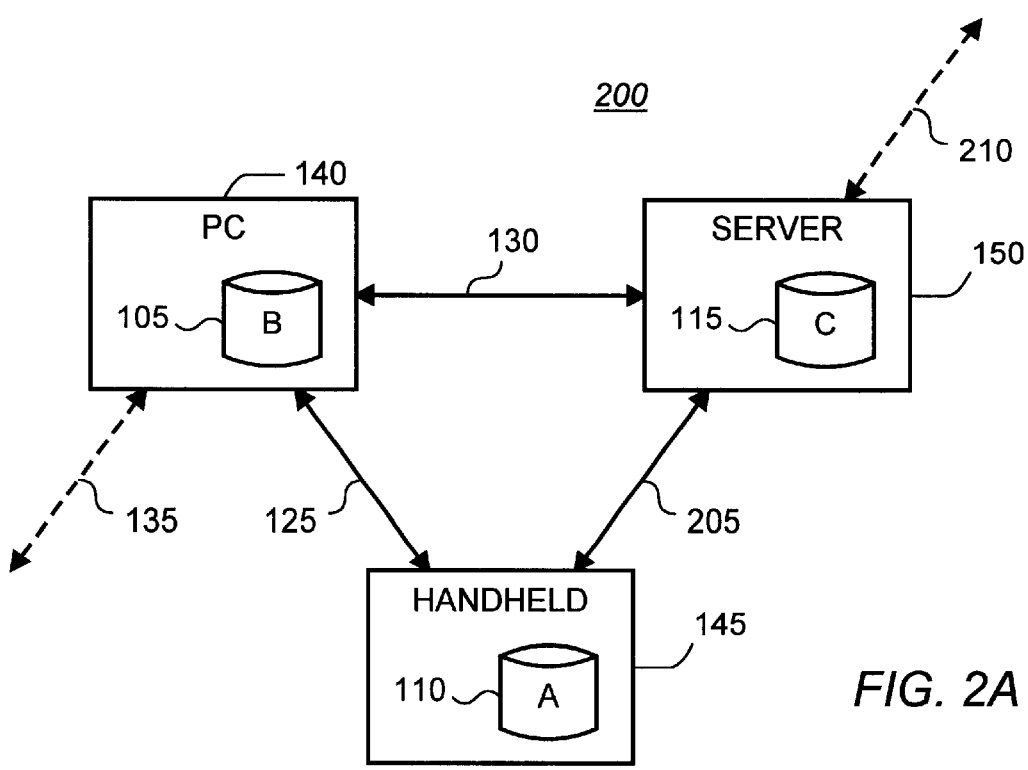
FIG. 2A is a block diagram that shows an example circular synchronization relationship that is desired for three datasets.

A configuration, such as the configuration 100 of FIG. 1, that has a single, permanently-designated hub dataset is useful for synchronizing the user's datasets, as long as the hub dataset is always available when synchronization is desired. However, as the user accumulates ever more datasets and uses them in ever more contexts, the user increasingly wishes to deviate from such a configuration. FIG. 2A illustrates an example 200 of a desired alternative configuration. The example configuration 200 includes many elements of FIG. 1 which retain their numeric labels from FIG. 1 and need not be introduced anew. The example configuration 200 is desired by a user who formerly maintained the configuration 100 of FIG. 1 and synchronized the handheld dataset 110 only via the PC dataset 105 and its device, the PC 140. As indicated in FIG. 2A, this user now also wishes occasionally to synchronize the handheld dataset 110 directly with the server dataset 115—i.e., without going through the formerly singular hub dataset 105. Perhaps the user wishes to synchronize directly the datasets 110, 115 via an Internet connection to the server 150 over a modem that has recently been acquired for the handheld device 145. In any event, the user wishes to synchronize directly the datasets 110, 115 via a synchronization path 205 that may not include the hub dataset 105 or its device 140. Furthermore, the user wishes occasionally to synchronize directly the datasets 110, 115 even when the dataset 115 and its server 150 are not capable of communicating with the former hub dataset 105 or its device 140. Nonetheless, the user still wishes to retain the ability to synchronize the dataset 110 with the old hub dataset 105 via the old synchronization path 125 at certain times.

In essence, the user wishes to deviate from the configuration 100 in a manner that may create a circular, or looping, synchronization relationship between three or more datasets, for example, the datasets 105, 110, 115 in the example 200. The user can use a new instance of Starfish's baseline multi-point synchronization system for the direct synchronization over the path 205. The new instance of the baseline Starfish synchronization system may be one that runs on the server 150 and maintains the dataset 115 as the new instance's own hub dataset, or GUD, for the instance's own self-centered view of the world. More particularly, the dataset 115 is a GUD that stores knowledge for direct synchronizations between the dataset 115 and what the dataset 115 considers to be its satellite or client datasets, namely, the datasets 105, 110 (and perhaps other(s) as suggested by the dashed line 210).

C. Synchronizations Need Information of Former Hub Dataset

As described, the direct synchronization between the datasets 110, 115 in FIG. 2A cannot take advantage of all knowledge stored in the former hub dataset 105. In particular, using the baseline synchronization systems, the direct synchronization between the datasets 110, 115 cannot make use of the status information (e.g., record mappings and synchronization times) collected in the former hub dataset 105 during synchronizations involving the former hub dataset 105. This inability to use previously-collected (or previously-collectible) knowledge can lead to gross inefficiencies, and even user-perceivable and large-scale data corruption.

Consider, for instance, the following example scenario. The datasets 105, 110, 115 are initially in a mutually synchronized state (e.g., all are empty). The user enters by hand (or by voice recognition, or other input means) a new contact data record (e.g., "Bob Smith" and associated phone numbers, addresses, and the like) into the handheld dataset 110. The user synchronizes the handheld dataset 110 with the PC dataset 105 to thereby propagate a new "Bob Smith" record into the PC dataset 105. The user also synchronizes the PC dataset 105 with the server dataset 115 to thereby propagate a new "Bob Smith" record into the server dataset 115. After the above-described synchronizations, the user invokes a server-150-based synchronization system to synchronize the handheld dataset 110 directly with the server dataset 115. At this point, the user data in the two datasets 110, 115 are already in a synchronized state. Therefore, there would ideally be very little left for the server-based synchronizer to do.

Unfortunately, the baseline server-based synchronizer is not capable of easily realizing that the user data in the two datasets 110, 115 are already in a synchronized state, given their circular synchronization relationship. The underlying cause, in essence, is that two different synchronization systems, with two different reference datasets (GUDs), were used in the synchronizations, and knowledge gained in an earlier synchronization (e.g., regarding record mappings) is not available during the later synchronization.

D. Without Permanent Hub, Inefficiency and/or Data Corruption Results

As a result of its inability to access knowledge gained in earlier synchronizations, the server-based synchronizer obtains a copy of certain user data (including, for example, the string "Bob Smith") of the handheld record over the path 205 without realizing that the server dataset already includes such data. Thus, the server-based synchronizer wastes communication bandwidth over the path 205 and computational resources. Under a worst outcome, the server-based synchronizer never does realize that the "Bob Smith" records in the handheld and server datasets 110, 115 should correspond to each other. In this worst outcome, the server-based synchronizer actually proceeds to (erroneously) replicate the "Bob Smith" records of each of the handheld and server datasets 110, 115 into the other of the handheld and server datasets 110, 115. Thus, the handheld dataset 110 and the server dataset 115 will each (erroneously) contain two mutually redundant "Bob Smith" records under the worst outcome.

E. Problems Can Perpetuate and Compound Forever

In general, synchronizing in a circular manner can cause the problem that started with just a single "Bob Smith" record to further "take on a life of its own." In particular, even without further user-modification of the "Bob Smith" records, subsequent synchronizations involving the various datasets can continue to suffer wasteful processing and communication of "Bob Smith" records . . . forever. This can happen, for instance, under the following scenario. Suppose that the user continues to synchronize the datasets 105, 110, 115 in a circle, perhaps once or twice per day using two synchronizers. With each loop of synchronizations, one of the synchronizers will change the dataset(s) involved so as to interfere with the other synchronizer's recognition of an existing mapping stored in the other synchronizer's GUD. In particular, one of the synchronizers will cause a new internal unique record identifier (ID) (e.g., an integer) to be assigned for a "Bob Smith" record in a dataset. Because the record ID is new, it will not be recognized during the next synchronization as being already mapped according to an existing mapping in the other synchronizer's GUD. (Mappings are based on record IDs.) By disrupting the existing mapping, the actually-old record will seem new and will be repeatedly propagated. Even worse, if the problem of erroneous record duplications (as described in a previous paragraph) is present, then the erroneous record duplications can multiply, in a vicious cycle, such that the number of essentially-identical "Joe Smith" records in one of the datasets can grow geometrically in successive synchronization loops, from two, to four, to eight, to sixteen, to sixty-four, and so forth.

F. Inefficiency Is Especially Objectionable During "First" Synchronizations

Even without the problem of duplication of data records, the wasted processing and communication associated with circular synchronization configurations, such as described above, can be dramatic and expensive. To illustrate just one practical effect of such problems, consider a user who has large amounts of data in his existing PC and server datasets 105, 115. The user frequently synchronizes these datasets via a land-line Internet connection 130, which costs very little to operate. One day, the user buys a new wireless communication device 145 containing an (empty) handheld dataset 110. The user synchronizes the handheld dataset 110 for the first time with the PC dataset via a serial-port-based cradle to load the handheld dataset 110 with large amounts of data from the PC dataset 105. In this first synchronization, all data is transferred (and not just a small number of changed records, as may be typical of subsequent synchronizations). Therefore, the synchronization takes quite a long time, e.g., many minutes. Thankfully, the serial-port-based cradle costs almost nothing to operate. Now the user is ready to use the handheld dataset 110 "in the field". The user decides to synchronize the handheld dataset 110 directly with the server dataset 115 via a wireless Internet connection 205. The wireless connection 205 is very expensive to operate, relative to the serial-cable-based cradle. Just before the direct synchronization, user data in the handheld and server datasets are typically already in a synchronized state (except perhaps for a few records that the user may have modified). However, the baseline server-based synchronizer that is conducting the synchronization has no easy way of realizing the already-synchronized state (or almost-synchronized state) of the datasets. Therefore, the server-based synchronizer will treat the direct synchronization like any other "first synchronization." In particular, the baseline server-based synchronizer will obtain user data from all records over the connection 205—slowly, expensively, and wastefully—because knowledge gained in the earlier synchronization with the PC dataset 105 regarding the contents of the handheld dataset 110 is not available in the present synchronization for quickly determining the true level of synchronization that may have already been attained through circuitous synchronization.

H. General Methodology for Synchronizing without a Sole Permanent Hub

A. 1st Solution: Synchronizers Share Information About "3rd-Party" Datasets

Figure 2B:
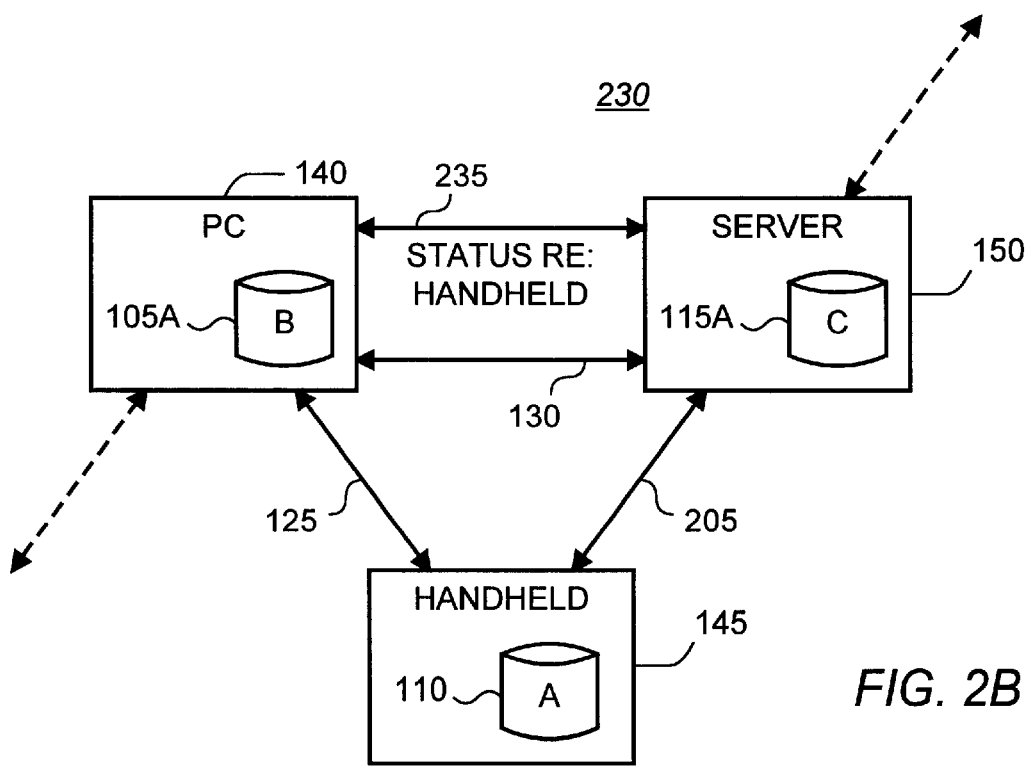
FIG. 2B is a block diagram that shows exchange of status information (e.g., regarding third-party datasets) during synchronization according to the preferred embodiment of the present invention, for datasets that have a circular synchronization relationship.

The preferred approach taken in the present invention to solve the above-described problems is to have multiple synchronization systems (synchronizers) exchange with one another knowledge beyond mere user data gained in past synchronizations. The synchronizers store such exchanged knowledge in their respective reference datasets (e.g., GUDs). The synchronizers can exchange such knowledge during, for example, a synchronization between the synchronizers. The exchanged knowledge preferably includes status information regarding the synchronizers' various client datasets, including "third-party" datasets. Third-party datasets are datasets other than two particular datasets (e.g., the GUDs of two synchronizers) engaged in direct communication or synchronization. FIG. 2B is a block diagram that illustrates the preferred approach schematically. FIG. 2B shows an example of the user's desired circular synchronization relationship, with additional exchange of status information (e.g., regarding "third-party" datasets) according to the preferred approach of the present invention. More particularly, FIG. 2B shows an example configuration 230. The configuration 230 includes the handheld dataset 110, a PC dataset 105A and a server dataset 115A. When the PC dataset 105A and the server dataset 115A are synchronized, status information is exchanged. The exchange of status information is shown schematically by the arrow 235. The status information exchanged includes status information regarding the handheld dataset 110, which is a third-party dataset during the synchronization of the PC dataset 105A and the server dataset 115A. By exchanging such additional status information and by recording the additional status information into each of the PC dataset 105A and the server dataset 115A according to the preferred embodiment, either dataset will contain, for use during the current synchronization and during future synchronizations, all (desired) status information collected by the other dataset in previous synchronizations. Such status information is used to avoid problems such as discussed in the previous section.

B. 2nd Solution: Adopt/Improve Duplicate Resolution for Circular Sync

A complementary (or alternative) approach taken by the present invention for improving circular synchronization is to employ improved duplicate resolution methods to avoid problems associated with circular synchronization. This approach works as follows. When a purportedly new record is received by a synchronizer from a client, the synchronizer determines whether the purportedly new record duplicates an existing record in the synchronizer's GUD. If so, the synchronizer directly establishes a mapping between the purportedly new record and the existing record in the GUD. The synchronizer directly establishes the mapping so that, thereafter, the state of the synchronizer is largely as if: (a) the synchronizer had already known of the mapping even before receiving the purportedly new record, and (b) the purportedly new record represents merely a record update and not a record addition. By immediately establishing a mapping between a received client record to an equivalent GUD record, the synchronizer avoids a problematic approach of creating a new empty GUD record, mapping the client record to the new GUD record, and only thereafter noticing that the new GUD record would be duplicative, and only then deleting the old GUD record to eliminate the duplication. The problematic approach is objectionable because it deletes the old record, under an implicit assumption that the newly-created GUD record is a fully-interchangeable replacement. The assumption is faulty, in a circular synchronization environment, because any previously-stored record mappings (e.g., in other synchronizer(s)' GUDs) that depend on the old GUD record's record ID will be rendered useless for certain purposes due to the new record's receiving a brand new record ID. More particularly, the new record ID of the newly-created GUD record will not be instantly recognized as already mapped by other synchronizers in later synchronization of the GUD by one of the other synchronizers. Thus, much already-seen user data (e.g., "Bob Smith") will have to be wastefully passed around during later synchronizations, perhaps forever, in the manner discussed in an earlier section about circular synchronization relationships, under the problematic approach.

C. Further Improvement: Resolve Duplicates to Minimize Future Disruptions

The present invention also includes, as an aspect, a second improvement to duplicate resolution. This second improvement is particularly useful in connection with the preferred approach, described above, of sharing status information (e.g., regarding record mappings to third-party datasets) between synchronizers. The second improvement is as follows. When a synchronizer determines that two records in the GUD are duplicates of one another, the synchronizer merges the two records into the one of them that has the fewest existing mappings (i.e., that is mapped to the fewest third-party clients). This approach attempts to minimize the number of third-party clients that are disrupted in subsequent synchronizations (i.e., when the record deletion is propagated to third-party clients). The second improvement to duplicate resolution is especially useful if combined with the preferred approach of sharing even third-party status information between synchronizers.

III. Introduction to Synchronization

A. Datasets, Records, and Synchronization

Datasets are collections of data. According to the present invention, the purpose of synchronizing two, or more than two, datasets is to update them as necessary with data from one another so that they contain the same or equivalent data (generally, the latest data), at least in the portions of the datasets that the user has designated for synchronization. Each dataset may be organized into individual data records. For example, a dataset having contact information may be organized into records, including a record listing a "Bill Smith's" phone numbers and addresses and another record listing a "Ted Brown's" phone numbers and addresses. In general, if records have been added to any dataset before a synchronization, then equivalent records are added to the other datasets as a result of the synchronization. Also, generally, if modifications or deletions of records have been made to one dataset before the synchronization, then equivalent modifications and deletions of corresponding records are made to the other datasets as a result of the synchronization.

B. Data Types and Data Fields

In synchronizing two, or more than two, datasets, a correspondence is generally established between particular records across the datasets. For example, a contact record for "Bob Smith, of Acme Widgets" may exist in every dataset (perhaps as a result of synchronization), and these records in different datasets may correspond to one another. The records in a dataset may be of various data types, for example, a time-zone type, a contact type, a calendar-entry type, a task (or "to do"-list-entry) type, a memo type, an electronic-mail type, or other types. In general, each record may include data organized into one or more data fields. For example, a contact-type record may include data for a "last name" field, a "first name" field, a "company" field, and many other fields. For many typical data types, it is not necessary for each record of the data type to have data for every possible field. For synchronization, a correspondence is typically established between particular data fields across datasets. For example, a "title" field for contact records in one dataset may correspond to a "Job Title" field for contact records in another dataset. In general, the systems and methodologies of the present invention can be adapted to work with any one type of data, or with any multiple types of data, and with arbitrarily defined or named data fields. For simplicity only, unless otherwise stated or unless context demands otherwise, discussion of synchronizing datasets may use language as if to assume that all datasets involved in the synchronization contain data of only a single type. It is to be understood that this simplification, and other simplifications made for ease of description, are not meant to limit the scope of the invention.

C. Record Transformations

When performing synchronization, a synchronization system transforms records from one dataset's representation into another dataset's representation. For example, the system may transform from an Internet Sidekick® cardfile for business contacts into a synchronization-system-internal representation. Typically, there is a one-to-one relationship between records in the source and target datasets. If this is not the case, however, the component of the system that interacts with a non-conforming dataset (e.g., a dataset accessor) includes logic to handle this non-conformity.

D. Field Mapping Types and Field Conversion Types

Record transformations are a combination of field mappings and conversions from a source record to a target record. It is often the case that there are significant differences in the number, size, type, and usage of fields between two datasets in a synchronization relationship. The specification of transformations generally depends on the particular datasets involved, and may be user configurable, with the synchronization system providing defaults.

E. Conflicts and Duplicate Records

In general, the user may make arbitrary changes to individual datasets and later synchronize the datasets. In general, each change made to a dataset (for example, addition, modification, or deletion of a record) by its user is propagated to other datasets as a result of a subsequent synchronization. However, it sometimes happens that two, or more than two, changes are in conflict with one another such that the changes cannot all be propagated without one change's undoing or otherwise interfering with another. Such changes give rise to a "conflict." For example, a conflict exists when a user has made a modification to a record in a first dataset, and has separately made a conflicting modification to the record's corresponding record in a second dataset. For a specific example, the user may have set a contact's (e.g., Bob Smith's) "title" field to "salesperson" in his handheld organizer device and separately set the corresponding contact's (Bob Smith's) "title" field to "Sales Manager" on the user's desktop PIM software (Personal Information Manager).

Occasionally, the user may cause the same, or matching, information to exist in different datasets without using the present invention, and then use the present invention to synchronize the datasets. For example, the user may cause records to exist for a "Bob Smith, of Acme Widgets" in multiple datasets, either by adding such records or by modifying existing records into such records. If the definition of the contact data type requires that the first name, last name, and company information for each contact be unique, then the example records would by definition match one another. In such a situation, simple-minded propagation of each added or modified record in each dataset to all other datasets would result in a duplication of records. Therefore, the present invention performs duplicate resolution to prevent such duplication. More particularly, embodiments of the present invention include improved duplicate resolution methods that are especially suitable for circular synchronizations.

F. Timestamps

The present invention often will make processing decisions based on comparing the time at which past events occurred. For example, the system may want to know whether a record in a dataset was modified before or after a most recent synchronization. Therefore, the time of various events should be recorded. One or more "timestamp" values in record fields are dedicated to this purpose. Preferably, all clocks are themselves accurate real-time clocks and produce timestamps that can be converted into a common time zone (e.g., GMT, Greenwich Mean Time) for mutual comparison. Typically, datasets involved in synchronization can be assumed to support a "last-modification-time" timestamp. Datasets that do not have timestamps at all, however, can still be synchronized using the present invention, but may require more processing by the present invention (for example, to perform exhaustive record comparisons) or more intervention by the user (for example, during conflict resolution). Also, datasets that have timestamps that are not made by real-time clocks (e.g., that have timestamps made by non-real-time clocks such as change counters) can also be synchronized using the present invention.

Further explanation of synchronization and related concepts (e.g., timestamps) can be found, for example, in the incorporated, commonly-owned U.S. patent applications having Ser. No. 09/311,781 (filed May 13, 1999) or Ser. No. 09/136,215 (filed Aug. 18, 1998). The explanations in those incorporated patent applications can be used to supplement the discussion in the present document, to the extent that the explanations in those incorporated patent applications is not superseded (e.g., contradicted) by the present document.

IV. The Synchronization System

A. System Hardware

Figure 3A:
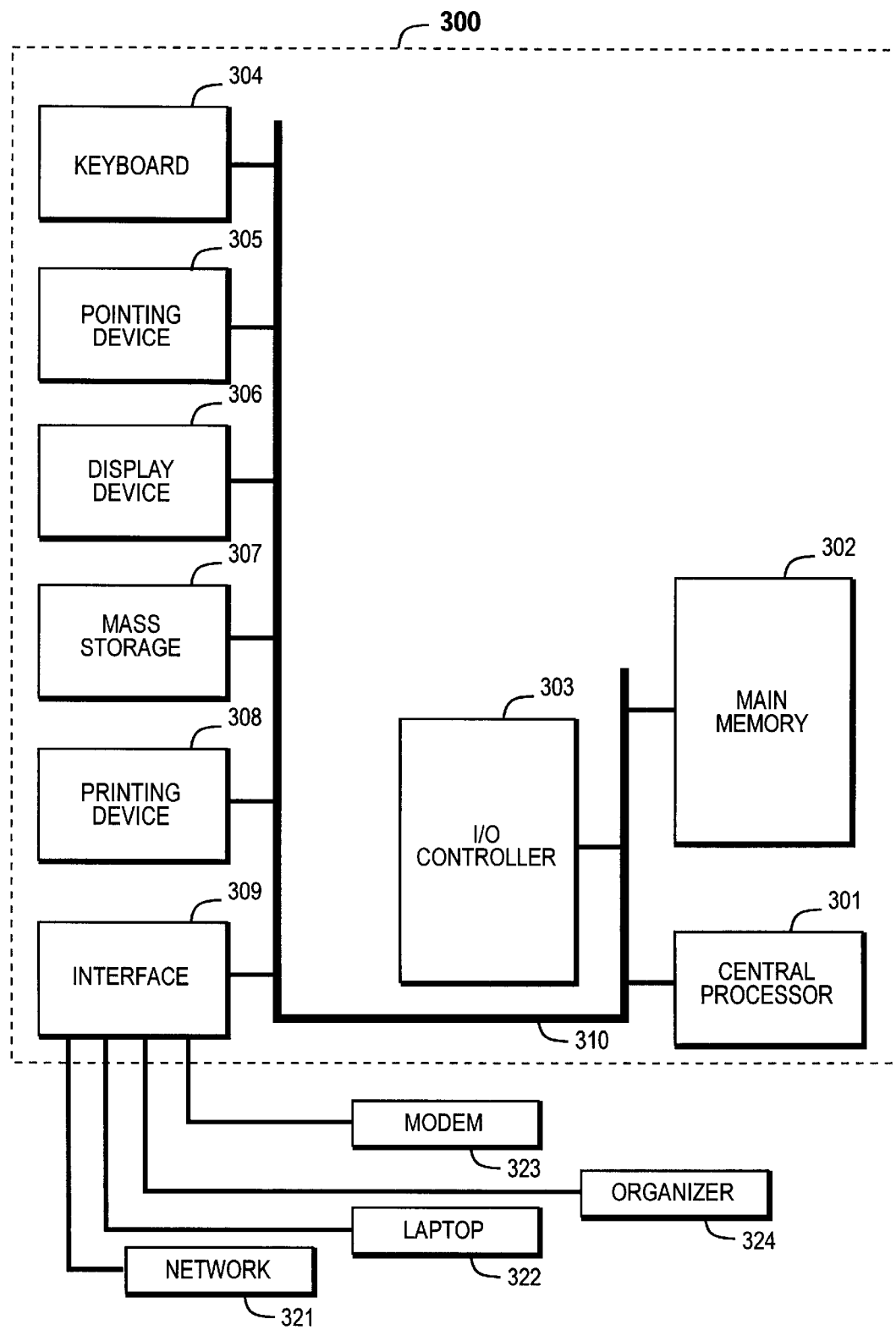
FIG. 3A is a block diagram of a computer system in which the present invention may be embodied.

The present invention may be embodied on one or more information processing systems such as the system 300 of FIG. 3A, which comprises a central processor 301, a main memory 302, an input/output (I/O) controller 303, a keyboard 304, a pointing device 305, pen device (or the like), a screen or display device 306, a mass storage 307 (for example, hard disk, removable floppy disk, optical disk, magneto-optical disk, or flash memory, and the like), one or more optional output device(s) 308, and an interface 309. Although not shown separately, a real-time system clock is included with the system 300, in a conventional manner. The various components of the system 300 communicate through a system bus 310 or similar architecture. In addition, the system 300 may communicate with or include other devices through the interface or communication port 309, which may be an RS-232 serial port or the like. Devices which will be commonly connected to the interface 309 include a network 321 (for example, a LAN (Local Area Network), a wireless communication network, the Internet, and the like), a laptop computer 322, a handheld organizer 324 (for example, the REX PRO™ organizer), a modem 323, and the like.

In operation, program logic (implementing the methodologies described herein) is loaded from the storage device or mass storage 307 into the main memory 302, for execution by the processor 301. Similarly, program logic (implementing the methodologies described herein) may be loaded into any included or connected devices. During operation of the program logic, the user enters commands through the keyboard 304 and/or pointing device 305 which is typically a mouse, a track ball, or the like. The computer system displays text and/or graphic images and other data on the display device 306, such as a cathode-ray tube or an LCD display. A hard copy of the displayed information, or other information within the system 300, may be obtained from the output device 308 (for example, a printer). In an embodiment, the computer system 300 includes an IBM PC-compatible personal computer (available from a variety of vendors, including IBM of Armonk, N.Y.) running Windows 9x or Windows NT (available from Microsoft Corporation of Redmond, Wash.). In a preferred embodiment, the system 300 is an Internet, intranet, wireless or other type of network server and receives input from, and sends output to, a remote user via the interface 309 according to standard techniques and protocols.

B. System Software

Figure 3B:
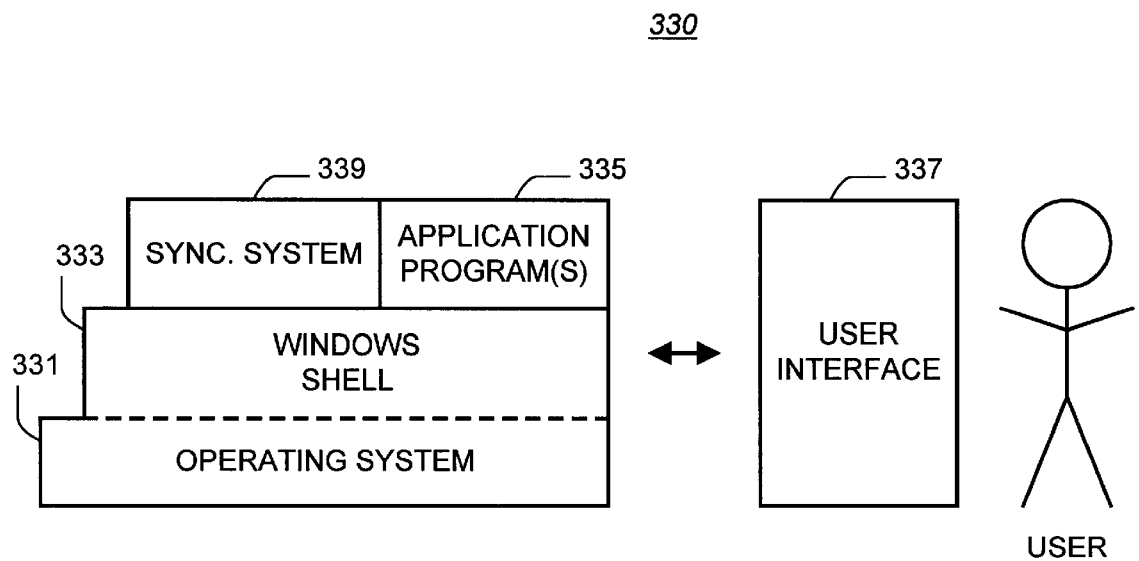
FIG. 3B is a block diagram of a software system of the present invention for controlling operation of the system of FIG. 3A.

Illustrated in FIG. 3B, a computer software system 330 is provided for directing operation of the computer system 300 of FIG. 3A. Software system 330 (which is stored in the main memory 302 and on the mass storage 307 of FIG. 3A) includes a kernel or operating system (OS) 331 and a windows shell 333. One or more application programs, such as client application software or programs 335 may be loaded (i.e., transferred from mass storage 307 into main memory 302) for execution by the system 300 of FIG. 3A. The software 335 includes a program 339 that includes a synchronizer core according to an embodiment of the present invention, which will be described in further detail in a later section.

The system 330 typically includes an optional user interface (UI) 337, preferably a Graphical User Interface (GUI), for receiving user commands and data and for producing output to the user. These inputs, in turn, may be acted upon by the system 300 of FIG. 3A in accordance with instructions from the operating system module 331, the windows shell 333, and the client application(s) 335. The UI 337 also serves to display prompts and results of operation from the OS 331, the windows shell 333, and the application(s) 335, whereupon the user may supply additional inputs or terminate the session. In one embodiment, the OS 331 and the windows shell 333 together comprise Microsoft Windows software (for example, Windows 9x or Windows NT). Although shown conceptually as a separate module, the UI 337 is typically provided by interaction of the application(s) 335 with the windows shell 333 and the OS 331. In the preferred embodiment, the OS 331 is part of an Internet server, and the UI 337 is provided at a remote computer via the Internet using standard Internet protocols.

C. A Modular View of the Synchronization System in its Environment

1. The Synchronization Environment

Figure 3C:
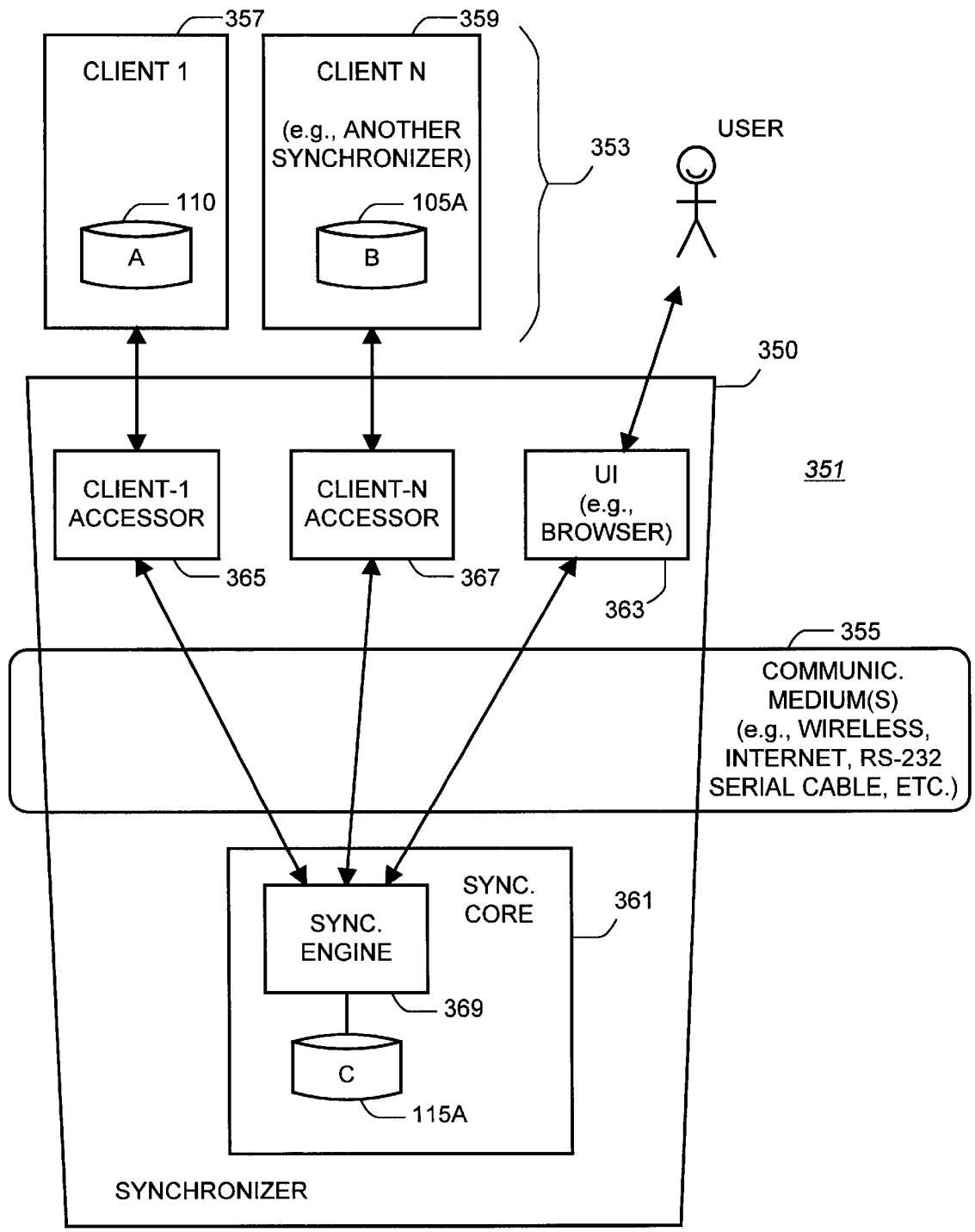
FIG. 3C is a block diagram that shows the synchronization system ("synchronizer") in which the present invention may be embodied.

FIG. 3C is a block diagram that shows a synchronization system 350 ("synchronizer") according to the preferred embodiment of the present invention in an example environment 351. The environment 351 includes communication mediums 355 (e.g., wireless network, Internet, desktop serial cable, and the like) and a number of synchronization clients 353. The synchronization clients 353 include user datasets and may participate in synchronization. As shown, the clients 353 include a first synchronization client 357 and an N-th synchronization client 359 that respectively include a dataset 110 and a dataset 105A. Examples of possible clients 353 include the StarTAC® clipOn Organizer, the Palm organizer, and PIM software applications such as Microsoft Outlook or Starfish's Sidekick®. (Sidekick is a registered trademark of Starfish.) A client, such as the client 359, may itself be another synchronization system, for example, another instance of the same or similar type of synchronization system as the synchronizer 350. The communication mediums 355 may include, for example, the Internet or wire-line and wireless communication channels of all types.

2. Overview of the Synchronization System

The synchronizer 350 includes a synchronizer core 361, an optional User Interface 363 (UI), and client accessors including, for example, a first client's accessor 365 and an N-th client's accessor 367. The synchronizer core includes a synchronization engine 369 and a reference dataset 115A. Each client accessor includes sufficient knowledge (e.g., client-specific knowledge) to enable the accessor to access (for example, read and write) information on a client's dataset and to communicate such information to and from the synchronizer core 361, via the communication mediums 355. Each client accessor may, and preferably does, run on a same machine as the client, e.g., on a remote machine with respect to the synchronizer core. Information stored by a client accessor is preferably stored on the accessor's local machine for efficiency.

The synchronization engine 369 controls the reference dataset 115A, which is also referred to as the synchronizer dataset or GUD ("Grand Unification Dataset"). The GUD is for storing a super-set of data from all datasets. Together, the synchronizer core 361 and the client accessors manage the synchronization process. The optional UI 363 provides optional interactive input and output to a user during the synchronization process. The UI 363 optionally includes a browser or terminal or similar user interface technology and enables the user to view or modify the information in the GUD to thereby provide PIM functionality using the GUD.

As will be further described, the present invention is particularly applicable to synchronizations between the GUDs of multiple, similar synchronizers. In such a synchronization, a client (for example, the client 359) is itself another instance of a synchronizer This client includes a synchronization engine, which can constitute the client accessor (e.g., the accessor 367) of the synchronizer 350. Similarly, the synchronization engine 369 of the synchronizer 350 can constitute a client accessor of the client synchronizer. In the remainder of this description, the terms "client" or "client dataset" alone may be used to refer to the synchronizer's client dataset accessor (e.g., the client synchronizer's engine) or the client's dataset, and the terms "synchronizer" or "server" alone may be used to refer to the synchronizer core or its reference dataset, for simplicity.

Context should make clear the intended meaning where a distinction is actually necessary.

3. A Layered System Architecture

Figure 3D:
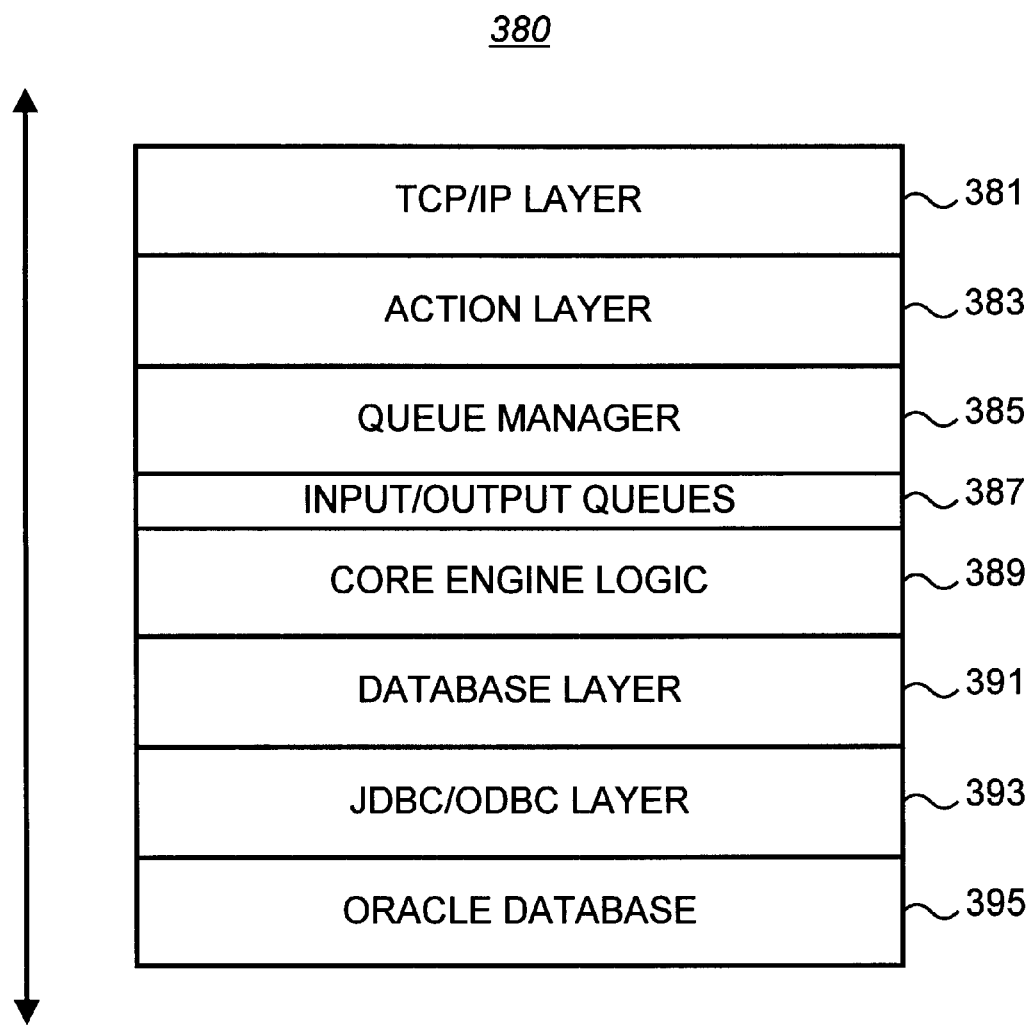
FIG. 3D is a block diagram that shows a layered system architecture for the core of the synchronizer of FIG. 3C.

FIG. 3D is a block diagram that shows a layered system architecture 380 for the synchronizer core 361 of FIG. 3C according to the preferred embodiment of the present invention. As shown, the architecture 380 includes a generic communication layer 381, an action layer 383, a queue manager 385, input and output queues 387, core synchronization logic 389, a database layer 391, an underlying generic database system 395, and an interface 393 to the underlying generic database system 395.

The core synchronization logic 389 controls and orchestrates, for synchronization, the flow of information between client accessors and the GUD, and the manipulation of such information. The core synchronization logic 389 communicates with client accessors by exchanging messages called action objects. The core synchronization logic 389 accepts input from client accessors by taking action objects from the input queue 387. The core synchronization logic 389 sends output to client accessors by placing action objects into the output queue 387. The core synchronization logic 389 performs synchronization, for example, by processing inbound (to the GUD) action objects and sending outbound (away from the GUD) action objects as necessary. Inbound action objects may include new or updated client records, or client record deletions, that may need to be propagated into the GUD (and thereafter from the GUD into other client(s), eventually). Each client record in an action object may include a client's local record ID, a priority time (e.g., last modification time), and record field name/field value pairs. The core synchronization logic 389 includes a logic loop that dispatches received action objects to appropriate handlers.

The generic communication layer 381, the action layer 383, and the queue manager 385 together implement communication of action objects between the client accessors (not shown in FIG. 3D) and the input/output queues 387. The generic communication layer 381 provides generic communication services for communicating with client accessors. For example, the generic communication layer 381 may implement the TCP/IP (Transmission Control Protocol over Internet Protocol) for communicating with client accessors over the Internet or an intranet using, for example, sockets or the like. The action layer 383 packs (e.g., serializes) outbound action objects for delivery by the generic communication layer 381 and unpacks (e.g., de-serializes) inbound communications received by the generic communication layer 381 into action objects. The queue manager 385 accepts unpacked inbound action objects from the action layer 383 and places them into the input queue 387. The queue manager 385 also removes action objects from the output queue 387 and hands them to the action layer 383 for packaging and sending to client accessors.

The core synchronization logic 389 interacts with the GUD via the database layer 391. The database layer 391 provides database services of the GUD (e.g., reading, writing, or deleting of GUD records, and like services). The database layer 391, in turn, calls upon the generic database system 395, for example, an Oracle Eight relational database system available from Oracle Corporation of Redwood Shores, Calif., or the like, to actually implement the GUD. The database layer 391 interacts with the generic database system 395, for example, via a standard JDBC driver (Java Database Connectivity) or ODBC driver (Open Database Connectivity) or the like that serves as the interface 393. Such drivers are available from a multitude of vendors, including, for example, Oracle Corporation or Sybase, Inc. of Emeryville, Calif. (which sells Sybase jConnect 4.0).

The synchronizer of FIGS. 3C and 3D may be constructed from Starfish synchronization system(s) that are described, for example, in the incorporated, commonly-owned U.S. patent applications having Ser. No. 09/311,781 (filed May 13, 1999), Ser. No. 09/208,815 (filed Dec. 8, 1998), or Ser. No. 09/136,215 (filed Aug. 18, 1998) by adding the additional features and synchronization methods described in the present document.

4. Overview of the Reference Dataset (GUD)

The GUD includes stored GUD records. These GUD records correspond to the most up-to-date, conflict-resolved records processed by the synchronizer during any synchronization since the GUD was created or last reset. The GUD records include data corresponding to data in client records and status information about the GUD records. In addition, the GUD includes status information about records in the clients. In particular, the client status information includes information about all records last known by the synchronizer to be in the clients and the mapping (i.e., correspondence) of those records to GUD records. Preferably, the client status information is organized as independent mapping tables that each includes information relating to all records last known to be in a particular client. The GUD will be discussed in further detail in a later section.

V. A Baseline Synchronization Method

Figure 4:
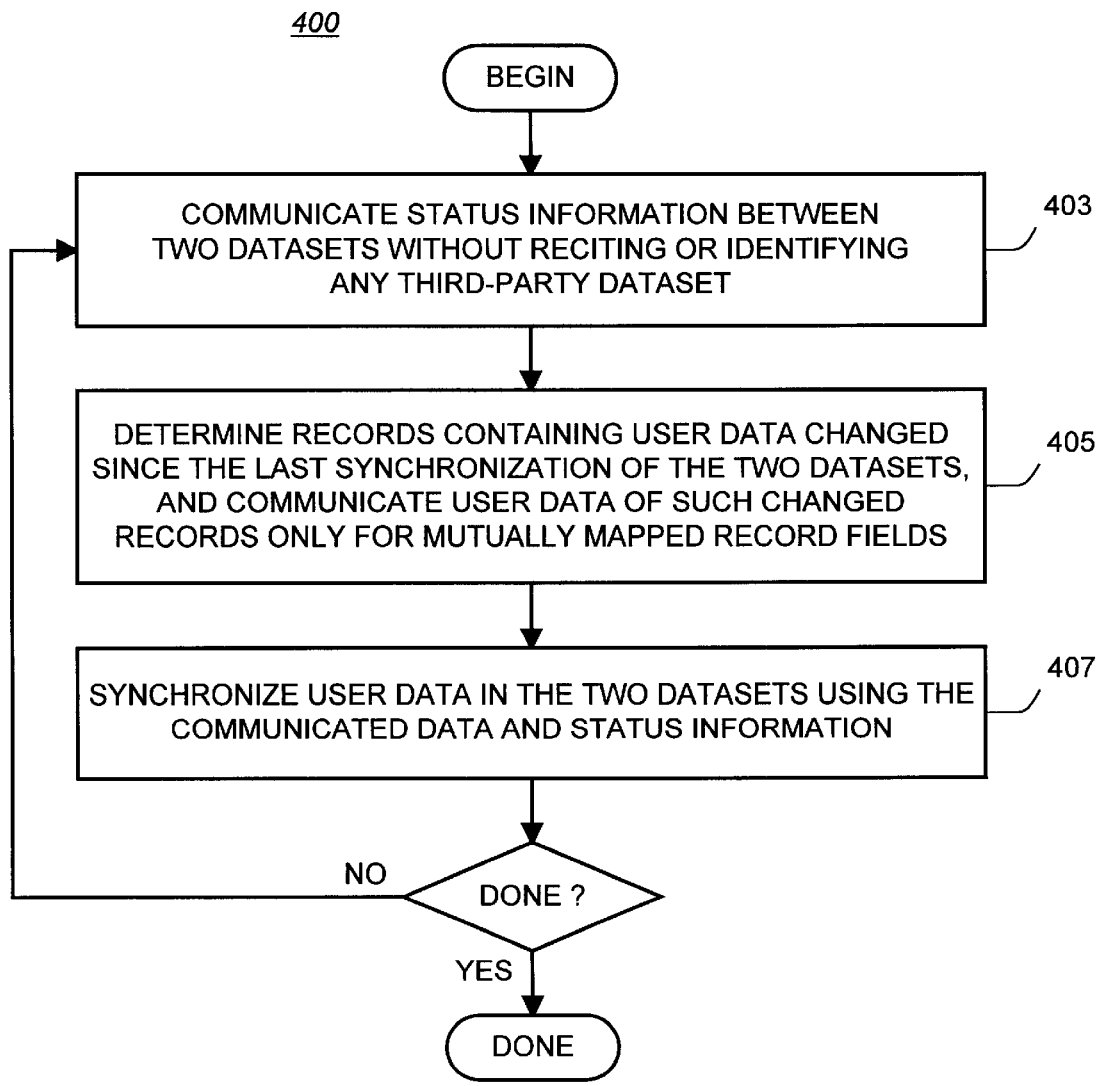
FIG. 4 is a flow chart that describes a baseline method for synchronizing two datasets without sharing information about any third-party dataset.

FIG. 4 is a flow chart that describes a baseline method 400 for synchronizing two datasets without sharing information about any third-party dataset. In the method 400, two datasets synchronize with each other, under guidance from a synchronizer, by initially communicating status information that does not recite or identify any third-party dataset, in a step 403. Next, in a step 405, the datasets determine records containing user data changed since the last synchronization of the two datasets, and communicate user data of such changed records only for mutually mapped record fields. Then, in a step 407, the datasets synchronize their user data using the communicated data and status information. The method used may be iterative, as is shown by the looping arrow in the flow chart.

The fact that the method 400 does not require communication of information that recites or identifies third-party datasets is actually a desirable feature, when the synchronizer is synchronizing with a simple client, such as a simple handheld dataset. More particularly, by keeping all information exchange largely grounded in the "context" of the client dataset (e.g., in terms of the client's internal record IDs, timestamps by the client's clock, and the like), the client can be very "dumb", even as dumb as a file system that can do little more than "read", "write", and "delete" records on command. However, such a method 400 is, in comparison with the preferred embodiment of the present invention, unnecessarily limiting when the client is "smart", e.g., when the client is itself another synchronizer. In particular, as was discussed in an earlier section about circular synchronization relationships, such a method 400 can be less than optimal when a circular synchronization relationship exists, because it prevents multiple synchronizers from cooperating, according to the preferred embodiment, for greater efficiency and correctness.

To illustrate an implementation of the method 400, consider the following example sequence of synchronizations.

According to the example, a synchronizer at a first dataset sends the time of a most recent previous synchronization with a second dataset, in the step 403. In the step 407, the second dataset sends its records that have been modified since this last synchronization time. In the step 407, the synchronizer propagates these received records into the first dataset, subject to conflict resolution. The synchronizer also sends, to the second dataset, records of the first dataset that have changed since the last synchronization time. These records sent to the second dataset have already been conflict resolved and are propagated into the second dataset. Without including improvements according to the present invention, the just-described embodiment of the method 400 is vulnerable to the type of problems described in an earlier section about circular synchronization relationships, when applied to circular synchronization scenarios. Such problems will be further described in greater detail in later sections, particularly in connection with duplicate resolution strategies and embodiments of the present invention that improve on baseline duplicate resolution strategies.

VI. The Preferred Synchronization Method

A. Introduction

The preferred synchronization method uses an approach of sharing status information among synchronizers. As was mentioned earlier, this approach is schematically illustrated by FIG. 2B. Referring again to FIG. 2B, the PC dataset 105A is preferably the GUD of a first instance (e.g., PC-based) of a multi-point synchronization system according to the preferred embodiment of the present invention. The server dataset 115A is preferably the GUD of a second instance (e.g., server-based) of the multi-point synchronization system according to the preferred embodiment of the present invention. More generally, any number of instances (e.g., even more than two instances) of the multi-point synchronization system of the preferred embodiment may exist, for a user. When these instances synchronize with one another, they exchange additional status information (e.g., regarding third-party datasets) as is schematically shown in FIG. 2B (shown for the GUDs 105A, 115A of two particular instances). Thus, each of the arbitrarily-many GUDs can contain status information (e.g., including record mappings, synchronization times, and the like) previously collected by arbitrarily-many other GUDs. Further, a GUD can receive such status information collected by another GUD via a chain of one or more other GUDs. For example, arbitrarily complex synchronization configurations of GUDs and non-GUD datasets are allowed. In any such configuration, the preferred embodiment of the present invention will propagate status information (e.g., including record mappings, synchronization times, and the like) as much as possible to reduce problems caused by circular synchronizations spanning a circle of any size. Preferably, all synchronizers in any such arbitrarily complex configuration are instances of the synchronizer according to the preferred embodiment.

B. Sharing Even 3rd-party Status and All User Data Among Datasets

Figure 5:
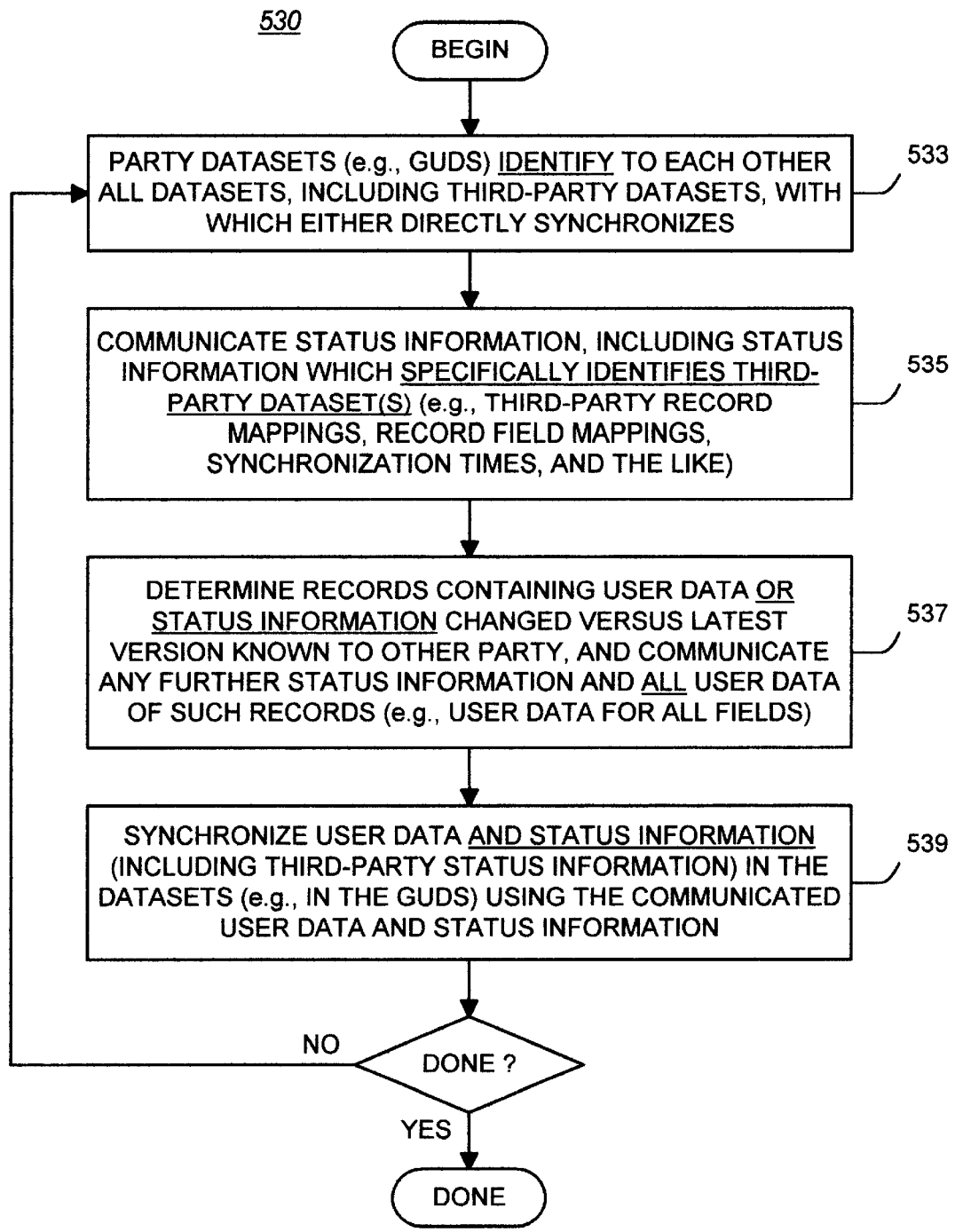
FIG. 5 is a flow chart that shows a method according to the preferred embodiment of the present invention for synchronizing (at least) two datasets using sharing of information about third-party datasets.

FIG. 5 is a flow chart that shows a method 530 according to the preferred embodiment of the present invention for synchronizing (at least) two datasets using sharing of information about third-party datasets (e.g., including non-party datasets). Recall that third-party datasets are datasets other than two particular datasets (i.e., party datasets) engaged in direct communication or synchronization. Non-party datasets are datasets not being synchronized in the current synchronization. Party datasets are preferably the reference datasets of synchronization engines. Party datasets and their associated control logic (e.g., synchronizer engines) together perform the synchronization in coordinated fashion.

As shown in FIG. 5, in a step 533, party datasets identify to other party datasets the identities of all datasets, including third-party datasets, with which any of the party datasets ever directly synchronizes or for which any of the party datasets has record-mapping or record-field-mapping information (e.g., a record mapping table). In a step 535, the party datasets communicate to other party datasets status information, including status information that specifically relates to (e.g., identifies) third-party datasets. Examples of status information that specifically relates to and identifies third-party datasets include record mappings and record-field mappings to a third-party dataset, last synchronization time(s) with a third-party dataset, and the like. In a step 537, party datasets determine and communicate their records that are fresh with respect to other party dataset(s) (; i.e., their records that are of later versions than the latest versions of the records previously known to another party dataset). In a step 539, the datasets, including status information that identify or otherwise specifically relates to third-party datasets, are synchronized using the communicated user data and status information.

As a part of the step 537, party datasets determine, for example, those of their records that contain changes not already seen by other party dataset(s). Such changes include changes to the records' user data or changes to the records' status information, including status information that specifically relates to (e.g., identifies) non-party dataset(s). For such changed records, the party datasets communicate user data, preferably all user data (e.g., data for all record fields that contain user data and not merely a user-mapped subset of such record fields). For such changed records, the party datasets also communicate further status information, as necessary, to ensure that not only user data but also certain status information can be synchronized among the party datasets. The certain status information include, for example, status information that specifically relates to (e.g., identifies) non-party dataset(s) (for example, all record mappings and record-field mappings to all third-part datasets and to all non-party datasets, all last synchronization times with all third-party datasets and with all non-party datasets, and the like). The net result of the method 530 is that, in effect, not only is the user data synchronized among the party datasets, but the certain status information is preferably also synchronized among the party datasets, such that each party dataset (e.g., each party synchronizer's GUD) contains a copy of the knowledge possessed by all party datasets (e.g., all party synchronizers' GUDs) for use in synchronization. The method 530 will be further illustrated using example synchronization sequences below.

VII. Further Details of the GUD

A. Some Example User-data Fields and Status Fields of the GUD

Before proceeding to discuss example synchronization sequences, it is helpful to list and name some example record fields of GUD records, including user-data fields and status fields. The GUD preferably contains at least the following information for each GUD record:

$ID_{INT}$ The internal GUD identifier for the GUD record.

VAL The data values for all data fields of the GUD record.

$T_{MOD}$ The latest time of modification for the GUD record within the GUD. (A separate time of modification, e.g., $T_{MOD}[i]$, is preferably kept for each and every user-data record field i of the GUD record, but for simplicity of discussion, the present description may sometimes refer to a single time of modification for the entire GUD record.)

$T_{PRI}$ The priority time for the GUD record. Preferably, the priority time is the time at which the user first gave rise to the value stored in the GUD record. For example, if the user hand-edited a record in a client dataset at a time T1 and synchronized the client dataset to the GUD at a time T2 to thereby transfer the value to the GUD, then $T_{MOD}$ equals T2 and $T_{PRI}$ equals T1. (A separate priority time, e.g., $T_{PRI}[i]$, is preferably kept for each and every user-data record field i of the GUD record, but for simplicity of discussion, the present description may sometimes refer to a single priority time for the entire GUD record.)

$C_{PRI}$ The identity of the client (priority-source client) from which the value of the GUD record came. (A separate priority-source client identity, e.g., $C_{PRI}[i]$, is preferably kept for each and every user-data record field i of the GUD record, but for simplicity of discussion, the present description may sometimes refer to a single client as supplying the current value of the entire GUD record.)

B. More Example Status Fields of the GUD, from the Mapping Tables

The GUD preferably further contains information relevant to the synchronization clients. Such information is preferably organized into mapping tables such that each client j has an associated mapping table that includes client-j-related information for every GUD record. For each GUD record, the GUD preferably contains at least the following information:

{$ID_{EXT}[j]$} The external identifiers for the GUD record. For each client j of the synchronizer, $ID_{EXT}[j]$ is the identifier within the client j for a record within client j, if the record exists and is known, that corresponds to (i.e., is mapped to) the GUD record.

{$T_{SYNC}[j]$} The last-known versions of corresponding (i.e., mapped) client records that have been taken into account by the GUD record's current values. These values are called the respective "last synchronization times" of the GUD with the corresponding client records. For each client j of the synchronizer, the GUD record's current values are known to have taken into account the value of the record $ID_{EXT}[j]$ as existed at the time $T_{SYNC}[j]$ in the client j. For example, if the GUD record has just been fully synchronized with a client j at a time T1, then the value of $T_{SYNC}[j]$ should be T1. Note that for some clients $T_{SYNC}[j]$ is identical for all GUD records (e.g., reflects a single "synchronization time" for the entire client dataset). $T_{SYNC}[j]$ is preferably according to the client j's clock.

{FRSH[j]} The "client-needs-updating" or "freshness" indicator for the GUD record. A value of TRUE in FRSH[j] indicates that the latest-known state of the GUD record's corresponding record $ID_{EXT}[j]$ in the client j is known to possibly need updating from the GUD record—i.e., that the GUD record is fresh with respect to the client j and its record $ID_{EXT}[j]$. For example, if the latest-known value of the client j's record $ID_{EXT}[j]$ participated in a conflict-resolution with the GUD and lost and has not yet been subsequently updated by the GUD, then FRSH[j] should be set to TRUE to indicate that the client j's record $ID_{EXT}[j]$ needs updating by the GUD. In the preferred embodiment of the synchronizer, the indicator FRSH[j] is maintained to be up-to-date with regard to a TRUE value. Further, in the preferred embodiment of the synchronizer the indicator FRSH[j] is also maintained to be up-to-date with regard to a FALSE value, such that if FRSH[j] is FALSE for a GUD record, then the client j will not be updated with the GUD record's value during synchronization.

{$Field_{13}$ Mappings[j]} The record-field mappings for GUD records (or at least for the GUD record). For each client j of the synchronizer, Field_Mappings[j] describes the mapping of record fields of any GUD record (or at least of the GUD record) to record fields of any corresponding record of client j. In the preferred embodiment, Field_Mappings[j] is identical for all GUD records. For example, all GUD records corresponding to records in a client j (e.g., a Sidekicks® cardfile) generally use a same field mapping Field_Mappings[j] for the client j. In general, Field_Mappings[j] can be referred to as a record-field mapping table.

The above lists of GUD record fields, including status fields in and out of the mapping tables, and including user-data fields, is illustrative and is not meant to be limiting or exhaustive. In particular, the present invention is also applicable to GUDs having additional or fewer record fields. Further details of GUDs may be found, for example, in the incorporated, commonly-owned U.S. patent applications having Ser. No. 09/311,781 (filed May 13, 1999) or Ser. No. 09/136,215 (filed Aug. 18, 1998).

C. Record Mappings (and Record-field Mappings)

As described above, the external identifiers, $ID_{EXT}[\ ]$, for GUD records are the record mappings of the GUD records to other datasets. As will be further discussed, the preferred embodiment of the synchronizer may set its GUD's $ID_{EXT}[j]$ status field for a client j with a value not obtained in direct synchronization of the synchronizer with the client j. In particular, the synchronizer may set the $ID_{EXT}[j]$ status field for a client j with a value obtained by the synchronizer during direct synchronization with another client, say, client m. In the synchronization with the other client m the client j is a third-party client, and the synchronizer sets the $T_{SYNC}[j]$ status field using third-party status information received from the other client m. Similarly, the preferred embodiment of the synchronizer may set it's GUD's Field_Mappings[j] status field for a client j with a value not obtained in direct synchronization of the synchronizer with the client j.

D. The Last Sync. Time: What the GUD Does Not Need from the Client

As described above, the GUD includes a $T_{SYNC}[j]$ status field for each record in connection with each client j. Essentially, $T_{SYNC}[j]$ indicates during a synchronization whether the client j needs not show its record to the synchronizer. In a particular, any version of the client record in the client that is no newer than the version that existed in the client at time $T_{SYNC}[j]$ needs not be shown (e.g., sent) to the synchronizer (e.g., GUD).

As will be further discussed, the preferred embodiment of the synchronizer may set its GUD's $T_{SYNC}[j]$ field for a client j with a value not obtained in direct synchronization of the synchronizer with the client j. In particular, the synchronizer may set the $T_{SYNC}[j]$ status field for a client j with a value obtained by the synchronizer during direct synchronization with another client, say, client m. In the synchronization with the other client m, the client j is a third-party client, and the synchronizer sets the $T_{SYNC}[j]$ status field using third-party status information received from the other client m.

Note that, as will be later described, this feature of setting the $T_{SYNC}[j]$ with an indirectly obtained value, while preferred, may optionally be omitted for simplicity. If this feature of setting the $T_{SYNC}[j]$ even with an indirectly-obtained value is used, then if a synchronizer is to implement the present invention, and the synchronizer itself needs to maintain the time of its last direct synchronization with a client j, then the synchronizer must of course maintain such a time in a separate status field, for example, a status field $T_{SYNC,DIRECT}[j]$. For such a synchronizer, $T_{SYNC,DIRECT}[j]$ at any time may or may not have the same value as $T_{SYNC}[j]$.

Note that the $T_{SYNC}[j]$ status field captures a particular aspect of a previous synchronization involving the client j, namely the version of a client record's value, involved in the previous synchronization, that is taken into account in the current corresponding GUD record. For certain styles of synchronization (e.g., a dedicated, synchronous, single-session, full-synchronization style), $T_{SYNC}[j]$ or $T_{SYNC,DIRECT}[j]$ is a single timestamp that largely captures all interesting aspects of the time of the previous synchronization. It is from such a style that $T_{SYNC}[j]$ or $T_{SYNC,DIRECT}[j]$ is simply called the "last synchronization time." In contrast, for certain other styles of synchronization, multiple timestamps are needed to adequately characterize the "time" of a previous synchronization. For example, if the client is synchronized asynchronously under high latency using lazy "trickling" exchanges of messages, many different send and receive timestamps may be used to characterize the "time" of a synchronization. Further details of asynchronous or trickling synchronization may be found, for example, in the incorporated, commonly-owned U.S. patent application having Ser. No. 09/311,781 (filed May 13, 1999).

Whatever the synchronization style used, every GUD that synchronizes with any particular client preferably retains a timestamp or other indicator that satisfies the description of the $T_{SYNC}[j]$ status field provided above in a listing in an earlier section. For example, in a GUD that is capable of asynchronous or trickling synchronization, a "csT_ClientSent" status field can give its value to the $T_{SYNC}[j]$ status field. In the remainder of this description, the text "last synchronization time", or simply "synchronization time", may be interpreted to refer to the version indicator $T_{SYNC}[j]$ as described in the above list, if context so demands and/or permits.

E. The Freshness Indicator: What the Client Does Not Need from the GUD

As described above, the freshness indicator for a GUD record indicates whether the GUD record is fresh with respect to a client j. The freshness indicator in the preferred embodiment is simply a boolean flag, FRSH[j]. As will be her discussed, the preferred embodiment of the synchronizer may set its GUD's freshness indicator (e.g., the FRSH[j] status field) for a client j not only based on information from direct synchronization of the synchronizer with the client j. In particular, the synchronizer may set the freshness indicator for a client j based on values obtained by the synchronizer during direct synchronization with another client, say, client m. In the synchronization with the other client m the client j is a third-party client, and the synchronizer sets the freshness indicator using third-party status information received from the other client m.

Preferably, a synchronizer only sends to a client j a GUD record (or a deletion signal for the record) if the record is "fresh" with respect to the client j. (A record in one dataset is fresh with respect to another dataset if the record includes values or deletion status of which the other dataset may be ignorant.) In general, any flavor of Starfish's synchronizers, before it is supplemented with the improvements of the present invention, already includes some means for determining whether a GUD record is fresh with respect to any client j. For example, in a Starfish synchronizer that synchronizes a particular client using an synchronous, single-session, full-synchronization style, the synchronizer will send a GUD record's value or deletion signal if the GUD record has changed since the synchronizer last directly synchronized the record with the client—i.e., since $T_{SYNC,DIRECT}[j]$. For other synchronizers that use other synchronization styles, other means for determining freshness already exist. Freshness-determining means for various synchronization styles are described in the incorporated, commonly-owned U.S. patent applications. For the purpose of the present invention, it is not necessary to require any particular means for determining freshness to already exist in a synchronizer before adding the improvements of the present invention. Instead, the improvements of the present invention may simply be added, and the freshness indicator FRSH[j] be kept up-to-date at all times (e.g., after every modification to the GUD).

VII. Example Synchronization Sequences with Sharing of 3rd-party Status Info

A. Example 1: Receive a New Record and its Mapping to a New Context

FIG. 6A is a table that depicts a first example sequence of synchronizations, including results, using the method of FIG. 5 according to the preferred embodiment of the present invention. The table of FIG. 6A shows selected contents of three datasets A, B, and C during a synchronization sequence. The three datasets A, B, and C can correspond respectively to the datasets 110, 105A, 115A of the configuration 230 shown in FIG. 2B. The dataset A is a handheld dataset that is not a GUD for any synchronizer. Consequently, the dataset A contains for each record only the record's internal identifier ($ID_{INT}$), the record's user data (VAL), and the record's modification time in the dataset A ($T_{MOD}$). In particular, the dataset A does not contain any mapping tables. The dataset B is the GUD of a first synchronizer (e.g., a PC-based synchronizer). The dataset C is the GUD of a second synchronizer (e.g., an Internet-server-based synchronizer). The datasets B and C contain for each record the user-data fields and status fields (including mapping-table fields) as described above for GUDs. Each cell of the table (other than cells for column- and row-labels) shows the contents of the indicated fields of all records in the indicated dataset as of just after the indicated time. In general, freshness indicators are by default FALSE in every cell, unless otherwise indicated. In certain cells, freshness indicators are affirmatively shown as being set to FALSE (by the struck-out text "FRSH") for redundant emphasis only. The table includes rows 603, 605, 607, 609, 611, and 613, which will be described below in due course.

As shown in FIG. 6A, at a time T0, the three datasets A, B, and C are initially empty. At a time T1, the user modifies the handheld dataset A to add a new record, as indicated at the row 603 of FIG. 6A. The record receives an internal ID of A3 in the dataset A. The value of the new record is X. At a time T2, the user synchronizes the handheld dataset A and the PC-based synchronizer's GUD B, as indicated at the row 605 of FIG. 6A. As a result, the GUD B adds a corresponding copy of the record A3. The added corresponding record in the GUD B receives an identifier of B9 in the GUD B. The mapping of the record B9 to the record A3 is stored in a mapping table in the GUD B. The record B9 is marked as being not fresh with respect to the corresponding record A3.

At a time T3, the user invokes either the PC-based or the server-based synchronizer to directly synchronize the GUDs B and C. As a result, the GUD C adds a corresponding copy of the record B9 of the GUD B. The added corresponding record in the GUD C receives an identifier of C5 in the GUD C. The mapping of the record C5 to the record B9 is stored in a mapping table in the GUD B and in a mapping table in the GUD C. (The two synchronizers provide such local record identifiers B9 and C5 to each other to establish mappings.) After the synchronization, each of the records B9 or C5 is marked as being not fresh with respect to the other.

In this synchronization between GUDs B and C, the handheld dataset A is a third-party dataset. If the GUDs B and C do not share third-party status information, then the result is as already described, as shown in the row 607 of FIG. 6A. If the GUDs B and C do share third-party status information, as is preferred, then the result is as shown in the row 609 of FIG. 6A. In particular, a mapping of the record in question to the record A3 of the handheld dataset A is communicated by the GUD B to the GUD C, and the mapping is then stored in the GUD C. The record CS is preferably marked as being not fresh with respect to the record A3. Optionally, the last synchronization time (T2) for the record in question with respect to the record A3 is also communicated by the GUD B to the GUD C and is stored in the GUD C. If the option to store the last synchronization T2 of the GUD B into the GUD C is not taken, then the last synchronization time in the GUD C is simply its default initial value of MINIMUM (e.g., negative infinity). Note that if the synchronizer of GUD B was used to perform the synchronizations of T2 and T3 in multi-point fashion, then T2 and T3 may be identical, in which event the row 605 of the table should be deleted.

At a time T4, the user uses the server-based synchronizer to directly synchronize the handheld dataset A with the GUD C. This is essentially the example scenario presented in an earlier section about circular synchronization relationships. If the GUDs B and C did not share third-party status information in the earlier synchronization of time T3, then various sub-optimal results are possible, as was mentioned in an earlier section about circular synchronization relationships. The row 611 is a placeholder for such sub-optimal results. Details of these sub-optimal results will be shown in a separate table in a later section that focuses on synchronizing without sharing third-party status information. If the GUDs B and C did share third-party status information in the earlier synchronization of time T3, according to the preferred embodiment, then the problems discussed in an earlier section about circular synchronization relationships can be avoided at the time T4. This optimal result is shown in the row 613 of FIG. 6A. In particular, because the server-based synchronizer already knows that the records A3 and CS should be mapped to each other, there is no danger of creating duplicate records or of creating new record IDs in either datasets A or C. Thus, a vicious cycle of further useless activity or data corruption in subsequent synchronizations is avoided. Further, if the option was taken to copy the last-synchronization time (T2) into the GUD C, then the server-based synchronizer will not request and (uselessly) receive actual user data of the record A3 at the time T4 because such user data was not last modified (T1) in the dataset A after the last-synchronization time (T2). Still further, because the record C5 was already marked as being not fresh with respect to the dataset A, the server-based synchronizer will not (uselessly) send user data of the record C5 to the dataset A at the time T4.

B. Example 2: Use Other-context Mapping to Map Pre-existing Records

1. Base Example: Pre-existing Records Have Same User Data

FIG. 6B is a table that depicts a second example sequence of synchronizations, including results, using the method of FIG. 5 according to the preferred embodiment of the present invention. The table of FIG. 6B has the same structure as the table of FIG. 6A. The table of FIG. 6B includes rows 633, 635, 637, 639, and 641, which will be described below in due course.

As shown in FIG. 6B, at a time T0, the three datasets A, B, and C are initially empty. At a time T1, the user modifies the handheld dataset A to add a new record, which receives the identifier A3, as indicated at the row 633 of FIG. 6B. At a time T2, the user synchronizes the handheld dataset A and the PC-based synchronizer's GUD B to cause a corresponding record B9 to be created in the GUD B, as indicated at the row 635 of FIG. 6B. At a time T3, the user directly synchronizes the handheld dataset A and the server-based synchronizer's GUD C to cause a corresponding record CS to be created in the GUD C, as indicated at the row 637 of FIG. 6B.

At a time T4, the user uses either the PC-based or the server-based synchronizer to directly synchronize the GUDs B and C. At this point, the GUDs B and C are essentially already synchronized (at least with respect to user data), but they do not already know this. Therefore, one of the GUDs B and C sends what it considers to be its freshly-added record (B9 or C5) to the other GUD's synchronizer. If the record is sent without third-party information (namely, the mapping to the record A3), then various sub-optimal results are possible, similar to results mentioned in an earlier section about circular synchronization relationships. The row 639 is a placeholder for such sub-optimal results. Details of these sub-optimal results will be shown in a separate table in a later section that focuses on synchronizing without sharing third-party information. If the record is sent with third-party status information, according to the preferred embodiment, then the synchronizer can immediately deduce that the records B9 and CS should be mapped to each other (since they are mapped to a common third-party record A3). Therefore, the proper mapping is directly stored into each of the GUDs B and C without further drama. This optimal result is shown in the row 641 of FIG. 6B. Note that the last-synchronization time for the record A3 is optionally updated in the CUD B to T3. This update would be especially significant, for example, if the user had hand-modified the record A3 at a time between T2 and T3, as is discussed below in connection with just such a variation on the base example sequence of FIG. 6B.

2. Variation: Received Pre-existing Record Was User-Modified

FIG. 6C is a table that depicts a variation on the second example sequence of FIG. 6B, including results, using the method of FIG. 5 according to the preferred embodiment of the present invention. The table of FIG. 6C has the same structure as the table of FIG. 6B. The table of FIG. 6C includes rows 633, 635, 636, 637A, 639A, and 641A, which will be described below in due course. As shown, the sequence of events in FIG. 6C is initially identical to the sequence of events in FIG. 6B, up until a time T2.5. In particular, at a time T0, the three datasets A, B, and C are initially empty. At a time T1, the user modifies the handheld dataset A to add a new record, which receives the identifier A3, as indicated at the row 633 of FIG. 6C. At the time T2, the user synchronizes the handheld dataset A and the PC-based synchronizer's GUD B to cause a corresponding record B9 to be created in the GUD B, as indicated at the row 635 of FIG. 6C.

At the time T2.5, the user modifies the record A3 in the dataset A, as indicated at the row 636 of FIG. 6C. Next, at a time T3, the user directly synchronizes the handheld dataset A and the server-based synchronizer's GUD C to cause a corresponding record C5 to be created in the GUD C, as indicated at the row 637A of FIG. 6C. At a time T4, the user uses either the PC-based or the server-based synchronizer to directly synchronize the GUDs B and C. At this point, the records B9 and C5 in the datasets B and C, respectively, should be mapped to each other, but the datasets B and C do not already know this. The user data of the records B9 and C5 are not already synchronized, due to the user modification of the time T2.5. One of the GUDs B and C sends what it considers to be its freshly-added record (B9 or C5) to the other GUD's synchronizer. If the record is sent without third-party information (namely, the mapping to the record A3), then various sub-optimal results are possible, similar to results mentioned in an earlier section about circular synchronization relationships. The row 639A is a placeholder for such sub-optimal results. If the record is sent with third-party status information, according to the preferred embodiment, then the synchronizer can immediately deduce that the records B9 and C5 should be mapped to each other (since they are mapped to a common third-party record A3). Therefore, the proper mapping is directly stored into each of the GUDs B and C without further drama. The latest value that reflects the user change of the time T2.5 is automatically propagated into the record B9 of the dataset B, according to priority-time-based conflict resolution (latest value wins). This optimal result is shown in the row 641A of FIG. 6C.

Note that the last-synchronization time for the record A3 is optionally updated in the GUD B to T3. This update would save the GUD B from having to (uselessly) receive the record A3 again in a subsequent direct synchronization with the dataset A, assuming no further modification of the record A3. This saving comes about because the server-based synchronizer will not request and (uselessly) receive actual user data of the record A3 in the subsequent synchronization because such user data was not last modified (T2.5) in the dataset A after the optionally-updated last-synchronization time (T3). Note also that the record B9 is preferably marked in the dataset B as being not fresh with respect to the record A3. (This marking is doubly emphasized by the struck-out text "FRSH" in the row 641A.) As a result, the PC-based synchronizer will not (uselessly) send user data of the record B9 to the dataset A during the subsequent direct synchronization between the dataset B and the dataset A.

C. Example 3: Receive a Mapped Record with New Other-context Information

FIG. 6D is a table that depicts a third example sequence of synchronizations, including results, using the method of FIG. 5 according to the preferred embodiment of the present invention. In light of the above discussions of the FIGS. 6A, 6B, and 6C, FIG. 6D is self-explanatory. The third example sequence is somewhat similar to the first example sequence. One difference between the third and the first example sequences is that the third example sequence demonstrates sharing of third-party information even for already-mapped records, and not merely for records being added.

IX. The Preferred Method in Detail

A. Overview

Figure 7A:
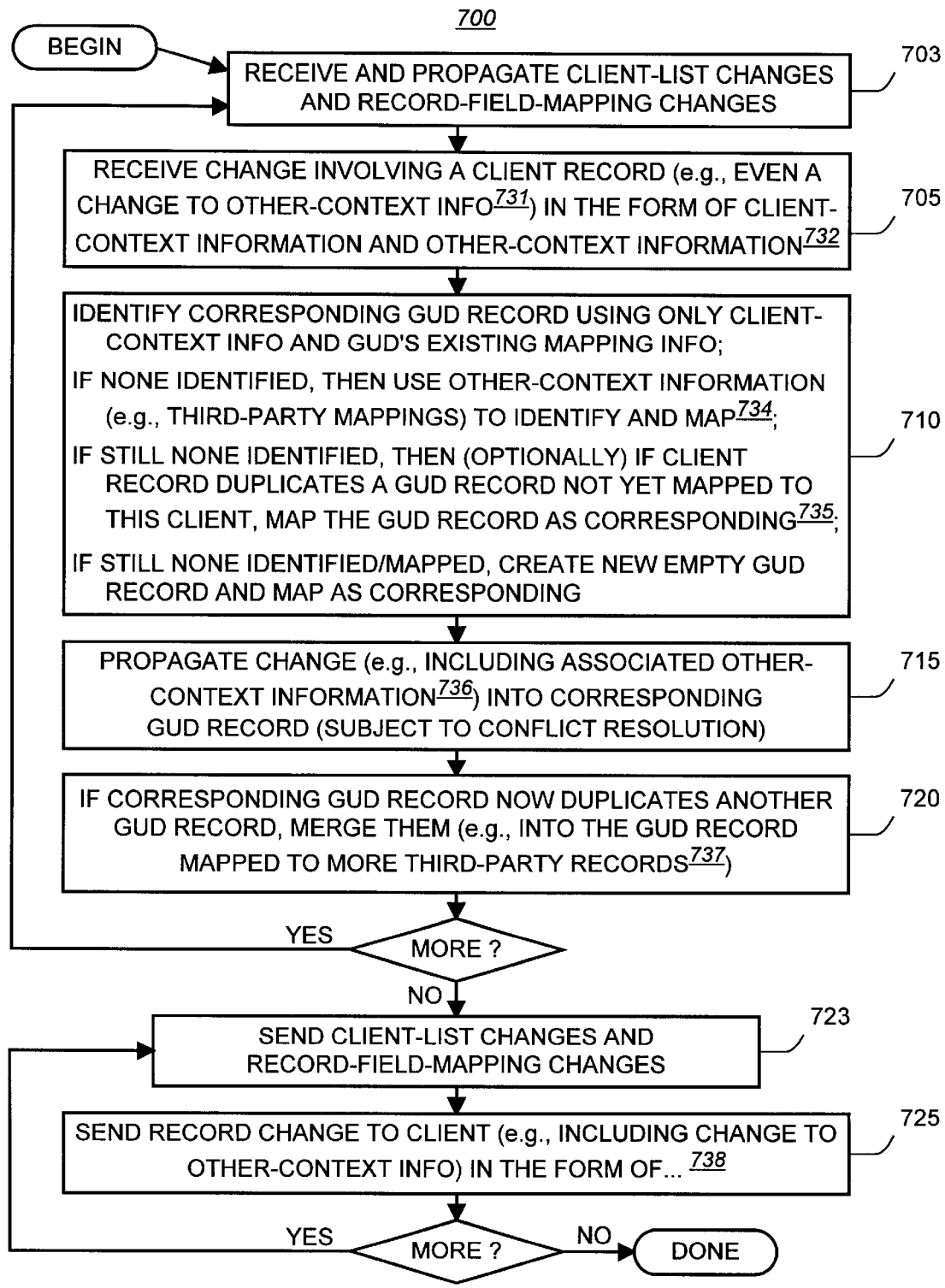
FIG. 7A is a flow chart that shows a method, according to the preferred embodiment of the present invention, that implements the method of FIG. 5.

FIG. 7A is a flow chart that shows a method 700 that implements the method 530 of FIG. 5 according to the preferred embodiment of the present invention. The method 700 is preferably implemented by the multi-point synchronizer of the preferred embodiment (the "preferred synchronizer"). The method 700 is to be used especially when a first instance of the preferred synchronizer is synchronizing its GUD with the GUD of another instance of the preferred synchronizer. In the following description, the first instance will be referred to as "the synchronizer", and the synchronizer's GUD will be referred to as "the GUD," unless context indicates or demands otherwise. In addition, the other instance of the synchronizer and/or the GUD of the other instance of the synchronizer may be referred to as "the client synchronizer", or simply, "the client"; context should make clear the intended meaning, if and where a distinction is actually necessary between the client synchronizer and its GUD.

As shown in FIG. 7A, the synchronizer in a step 703 receives, from the client synchronizer, all changes relating to a list of clients (including any third-party clients) known to the client synchronizer. The synchronizer also receives, from the client synchronizer, all changes to the record-field mappings for all records with regard to all clients of the client synchronizer. The synchronizer propagates such changes into the GUD, subject to any conflict resolution. Next, the synchronizer in a step 705 receives a change involving a record in a client (e.g., involving a record in a client synchronizer's GUD). This change reflects a record in the client that has been modified since the latest previous synchronization between the client and the GUD. Then, the synchronizer in a step 710 determines a GUD record that corresponds to (i.e., is mapped to) the received changed client record. Among the sub-steps of the step 710 is a sub-step in which if no such already-mapped GUD record exists and is found, the synchronizer creates a new and empty GUD record and maps the received changed client record to the new GUD record. Next, in a step 715, the synchronizer propagates information of the received changed record into the corresponding GUD record, subject to detection and resolution of any conflict(s) between the received changed record and its corresponding GUD record. If the GUD record, as altered, is duplicative of another GUD record, the synchronizer in a step 720 merges the two duplicate records using duplicate resolution techniques.

The steps 705, 710, 715, and 720 are repeated for any other changes from the client, in a first loop. If the synchronizer is performing simultaneous multi-point synchronization, then the steps 705, 710, 715, and 720 are further repeated in the first loop for any changes from all other clients participating in the synchronization. In the first iteration of the first loop for any client, the synchronizer executes the step 703. With each iteration of the first loop, the synchronizer's GUD and the particular client involved are the two party datasets. After there are no more changes from the client(s), the synchronizer in a step 723 communicates to a client any and all changes to the list of clients (including any third-party clients) in the client, as last known to the synchronizer. The synchronizer also communicates to the client any and all changes to the record-field mappings in the client, as last known to the synchronizer, for all records with regard to all clients (e.g., including third-party clients). Next, the synchronizer in a step 725 communicates a GUD record that has changed in relation to the information in the client, as last known to the synchronizer. The synchronizer repeats the step 725, in a second loop, for any other changes from the GUD that need to be sent to any client dataset. In the first iteration of the second loop for any client, the synchronizer executes the step 723. With each iteration of the second loop, the synchronizer's GUD and the particular client involved are the two party datasets.

The flowchart of FIG. 7A includes, in its boxes of text, a number of labels 731–738. These labels correspond to particular portions of text, in the boxes, that describe particular features of the steps of the method 700. The above-introduced steps 705, 710, 715, 720, and 725 of the method 700 will now be described in further detail, with reference made to the labels 731–738 of FIG. 7A.

B. Receive and Propagate 3rd-Party Contexts and Field Mappings

1. New Contexts

In the step 703, the client synchronizer communicates to the synchronizer the client synchronizer's list of clients. The synchronizer receives such communications and propagates the received information into the GUD, subject to (automatic or manual) resolution of any conflicts. For example, if the client synchronizer has added additional third-party client(s), the client synchronizer lets the synchronizer know. If such an additional third-party client was not previously known to the synchronizer, then the synchronizer creates a new and empty record-mapping table (and corresponding record-field-mapping table) for the newly-heard-of dataset. Any third-party client is a context. Communications according to such a context is in terms of internal record IDs of the third-party client, timestamps by the third-party client's clock, and the like. Thus, in the step 703 the synchronizer may receive new contexts, i.e., contexts that the synchronizer had not known before. Note that a context is indicated, for example, by its dataset ID. The dataset ID may be a unique ID (e.g., 64-bit value) generated by or for each dataset as its permanent dataset ID. This identifier may be generated by or for each dataset, for example, by concatenating the device's or software application's manufacturer, model, serial number, and dataset creation time. For example, a microprocessor's unique identifier may be used.

2. New Field Mappings

In the step 703, the client synchronizer also communicates to the synchronizer the client synchronizer's record-field mappings for the client synchronizer's clients. The synchronizer receives such communications and propagates the received information into the GUD, subject to (automatic or manual) resolution of any conflicts. For example, if the client synchronizer has added a new mapping of a record field to a record field in a third-party client, the client synchronizer lets the synchronizer know. The synchronizer transforms this mapping between the client synchronizer's fields and a third-party synchronizer's fields into a mapping between the synchronizer's fields and the third-part synchronizer's fields in a straightforward fashion. The synchronizer adds the mapping to the GUD, if the mapping was not already in the GUD.

C. Receive a Record Change from the Client

1. Synchronizer Requests Changes from the Client

In the step 705, the synchronizer receives a change involving a record in a client, as mentioned above. The received change may be sent by the client along with all other fresh changes. The fresh changes may be sent by the client in response to a request for fresh changes from the synchronizer. In general, each change includes the client record, which includes the client's local record ID, a priority time for the client record (preferably field-by-field priority times, if the client is itself another instance of the preferred synchronizer), and either a delete signal or a set of record field name/field value pairs for all fields.

There are various ways for the synchronizer to request fresh changes, or to receive fresh changes even without a direct and specific request. In one way, the synchronizer asks for all records from the client that were changed in the client after a particular time, e.g., a single last-synchronization time that applies to the entire client. In another way, the synchronizer keeps a last synchronization time for each mapped client record and requests only newly-added (i.e., previously-unmapped) client records or previously-mapped records that have been updated or deleted in the client after their respective record-specific last-synchronization times. In yet another way, the client is itself a synchronization engine that keeps track of what is fresh with regard to the synchronizer, and the synchronizer simply asks for and receives "fresh" records, or merely receives fresh records at the client's discretion ("push style"). Whatever the way, the last synchronization time (either for the client as a whole or for a single client record) is the time such that the GUD's current corresponding values are known to have taken into account the value in the client, as of the last synchronization time (e.g., version indicator), of the client's record(s) in question.

2. Change Can Involve (e.g., Solely) Non-User Data (e.g., 3rd-party Info.)

In the step 705, the received change may be an addition or deletion of a record, or a modification to user-data portions of a record. In addition, as indicated in FIG. 7A at the label 731, the change may include or even consist solely of a modification to status information (e.g., non-user-data portions) of the record. For example, the change may reflect a record that has changed in the client only in the record's "other-context" information, e.g., in status information that is not exclusively in the context (e.g., local record IDs, local-clock timestamps, and the like) of the client dataset or of the synchronizer's GUD. Such other-context information may include, for example, status information that specifically identifies third-party dataset(s) (e.g., any record mapping or record-field mapping to any third-party dataset, any last-synchronization times with any third-party dataset, and the like). Thus, the client preferably maintains a modification timestamp for each record that reflects the time of modification of even non-user-data portions of the record. The client uses this modification timestamp in determining fresh changes to be sent to the synchronizer (e.g., if requested to send all client records changed in the client after a particular time).

3. All User Data of a Changed Record is Communicated

In the step 705, the change preferably is communicated to the synchronizer in the form of the entire record of the client dataset. For example, user data for all record fields is preferably communicated. In effect, all user-data-containing record fields in each party dataset are mapped to corresponding record fields in every other party dataset. If the user specifically prefers to map only a subset of the user-data-containing record fields between two particular party datasets, e.g., for viewing purposes, then the remaining user-data-containing record fields are nevertheless mapped using additional mappings that the user needs not see but that are nevertheless used for synchronization.

4. Other-context (e.g., 3rd-party) Information is Also Communicated

In the step 705, as indicated in FIG. 7A at the label 732, the communicated record includes not only all user data of the changed record but also non-user-data portions of the client record beyond mere modification times or priority times. For example, the communicated non-user-data portions include other-context status information such as described above. More particularly, the communicated non-user-data portions preferably include all record mappings and record-field mappings to all third-party datasets, all last-synchronization times and freshness indicators with all third-party datasets, and the like. Notably, the other-context information may include information related to new contexts (e.g., of new third-party dataset(s)) added in the step 703. For example, information related to a new context may include a mapping of the client's record to a record of a dataset with which the synchronizer has never previously directly synchronized or for which the synchronizer did not have a record mapping table previously to the current synchronization. All record mappings may be communicated as a vector of dataset-ID/dataset-record-ID pairs. For example, the dataset ID of a dataset may be a unique ID (e.g., 64-bit value) generated by or for each dataset as its permanent dataset ID. The dataset record ID is simply the internal record ID in the particular dataset indicated by the dataset ID.

D. Map the Client Record to a GUD Record

1. Identify a Pre-existing Mapping between Client and GUD Records

In the step 710, the synchronizer first tries to find an existing mapping between the client record of the received change and an existing GUD record. This is done by searching the record mapping table corresponding to the client record's client for an entry having the client record's client-internal record ID. If such a corresponding (i.e., mapped) GUD record is identified, execution proceeds to the step 715.

2. Map Client and GUD Records Using Other-context Information

In the step 710, if no GUD record is yet identified that already corresponds to the received client record, the synchronizer next attempts, as indicated in FIG. 7A at the label 734, to map the received client record and the GUD record using other-context information received as a part of the received client record. More particularly, the synchronizer attempts this identification by attempting to identify a GUD record that is already mapped to a record, in a third-party dataset, to which the received client record claims to correspond. To illustrate, suppose the received client record from a client A has an internal record ID of A3 in the client A. The received client record includes third-party record-mapping information indicating that the record A3 is mapped to a record B9 in a third-party dataset B. By searching through the GUD, which is called dataset C, the synchronizer discovers that a record C5 in the GUD already corresponds to (i.e., is mapped to) the record B9 of the third-party dataset B. Therefore, the synchronizer identifies the GUD record C5 as corresponding to the received client record A3 and maps the received client record A3 to the GUD record C5 in the GUD.

The above-described identification is now described in greater detail in this paragraph. The synchronizer iterates through the third-party record mappings received with the client record. For each third-party record mapping, or dataset-ID/dataset-record-ID pair (e.g., "B/B9" in the previous example), the synchronizer looks in a record-mapping table, if one exists in the GUD, that corresponds to the dataset of the dataset ID (e.g., "B"). In this record-mapping table, the synchronizer searches for an entry that has the dataset record ID (e.g., "B9") of the dataset ID/dataset record ID pair. If such an entry is found, then the GUD record (e.g., "C5") of such an entry should correspond to the received client record (e.g., "A3"), and the synchronizer maps the received client record to the GUD record. (The GUD record should not already be mapped to a record of the client of the received client record, in the preferred embodiment.) If the received client record is mapped to the GUD record, execution proceeds to the step 715.

3. (Optionally) Use Improved Duplicate Resolution for Record Mapping

In the step 710, if still no GUD record is yet identified or mapped to the received client record, the synchronizer next optionally attempts, as indicated in FIG. 7A at the label 735, to identify an existing GUD record to be mapped to the client record as corresponding using a special application of a special duplicate resolution technique. (A record duplicates another record if the two records are equivalent according to some definition—e.g., if the two records have the same values in certain key fields.) In essence, if the client record duplicates a GUD record that is not yet mapped to any record of the client, the synchronizer maps the duplicated GUD record as corresponding to the received client record, without also instructing/causing the client to change the client record's record ID in the client and without also changing the GUD record's record ID in the GUD. If the received client record is in this optional way mapped to the GUD record, execution proceeds to the step 715. Note that this optional special application of a special duplicate resolution technique, for the purpose of mapping previously-unmapped received client records, is somewhat aggressive and is especially preferred if it is believed or assumed that the user never or only rarely intentionally creates duplicate records in any single dataset by hand or intentionally deletes a record from a dataset and then hand-creates an equivalent replacement in the same dataset or another dataset.

4. Create New GUD Record and Map Client Records to It

In the step 710, if still no GUD record is identified or mapped to the received client record, the synchronizer finally creates a new and empty GUD record and maps the new and empty GUD record as corresponding to the received client record. The new and empty GUD record receives an initial priority time, for every field, of MINIMUM (e.g., negative infinity).

E. Propagate Information into the GUD

1. Introduction

After the step 710, the synchronizer in the step 715 propagates information from the received client into the corresponding GUD record that was determined in the step 710, subject to conflict resolution. In particular, not only is the client-context information propagated into the corresponding GUD record (subject to conflict resolution) but, as indicated in FIG. 7A at the label 736, other-context information received as a part of the client record is also propagated into the corresponding GUD record (subject to conflict resolution). In general, the propagated information includes, in addition to received user data, received non-user-data portions of the client record beyond mere modification times, priority times, and priority-source client identities. Such received non-user-data portions of the client record may include, for example, status fields that involve third-party datasets. Such received status fields that involve third-party datasets may include, for example, record mappings, record-field mappings, last synchronization times, and client-needs-updating (i.e., freshness) indicators.

2. Propagate User Data (e.g., Client-context Information)

Conflict resolution of user data fields, preferably on a field-by-field basis, is according to the method of a Starfish multi-point synchronization system as is discussed, for example, in the incorporated, commonly-owned U.S. patent application having Ser. No. 09/311,781 (filed May 13, 1999). In essence, the information in any field of the received record is copied into (e.g., overwrites) the corresponding field of the corresponding GUD record if the field of the received record wins a conflict resolution (either manual or automatic) over the corresponding field of the corresponding GUD record. Preferably, a "latest-value-wins" automatic conflict-resolution is used such that the field of the received record wins a conflict resolution if, and only if, the priority time of the received record's field is later than the priority time of the corresponding field of the corresponding GUD record.

3. Propagate 3rd-party Record Mappings

Third-party record mappings received with a client record are propagated into the client record's corresponding GUD record (e.g., into the mapping table entry) in a straightforward manner. In the preferred embodiment, there is typically not any conflict between received third-party record mappings and the GUD's existing record mappings if the user uses only preferred synchronizers of the present invention. (Put another way, typically, either the GUD did not already have an existing mapping or an existing mapping for the GUD record is identical to the received third-party mapping.) The synchronizer checks for such conflicts between mappings, and if a conflict is detected the synchronizer will resolve the conflict, preferably automatically. Automatic conflict resolution preferably is done by choosing the GUD record's existing mapping as the winner of the conflict and therefore not overwriting the GUD record's existing mapping. Preferably, there will be no such conflicts, Note that if a client record does not include a mapping to any record in a third-party dataset m but the GUD record does include such a mapping to a record in the third-party dataset m, then the client record's nonexistent mapping is considered to have lost a conflict with the GUD record's mapping.

4. (Optionally) Propagate 3rd-party Synchronization Times

If a user-settable option to propagate third-party last synchronization times (i.e., version indicators of already-accounted-for records of the third-party dataset) is turned on, then the synchronizer uses the following procedure. Any received last synchronization time of a client record, in relation to a third-party dataset j, is propagated into the corresponding GUD record (e.g., into the mapping table entry $T_{SYNC}[j]$) if the received third-party synchronization time is later than the GUD record's existing synchronization time $T_{SYNC}[j]$ for the third-party dataset. Put another way, the later of the two third-party synchronization times wins a conflict resolution. Note that when any entry in the mapping table for any client j was first created, the last synchronization time $T_{SYNC}[j]$ was initially set to MINIMUM, e.g., negative-infinity. The practical result of propagating third-party synchronization times is that, when two party datasets are synchronized, information is exchanged such that each party dataset knows what versions of user data (or status information) the party dataset needs not see from particular third-party datasets in any future synchronization.

5. (Optionally) Propagate 3rd-party Freshness Indicators

A freshness indicator received in a received client record with respect to a third-party dataset j indicates whether the client record was marked in the client as being fresh with respect to the third-party dataset j. Such a received freshness indicator with respect to the third-party dataset j will be referred to as FRSHReceived[j] in the present discussion. If a user-settable option to propagate third-party freshness indicators is turned on, then the synchronizer uses the following procedure. In the procedure, one of the factors considered for each third-party dataset j is whether the received client record has lost any conflict resolution to the GUD record in any record field that is mapped to the third-party dataset j. Such conflict resolutions are the "relevant" conflict resolutions with respect to the third-party dataset j. If the third-party dataset j is itself a synchronizer that shares other-context status information according to the present invention, then all fields that can be propagated are considered to be mapped, and the relevant conflict resolutions are conflict resolutions in any such field whatsoever, including in the status fields for third-party mappings, third-party last-synchronization times, or third-party freshness indicators.

According to the procedure, the synchronizer sets the freshness flag FRSH[j] with respect to each third-party dataset j as follows. If the received client record lost a relevant conflict resolution to the GUD record, and the GUD record also lost a relevant conflict resolution to the received client record, then set FRSH[j] to TRUE and proceed to the next third-party dataset (e.g.,j+1). Otherwise, if neither the client record nor the GUD record lost a relevant conflict resolution to each other (i.e., the client record and the GUD record were already identical in their relevant user-data and non-user-data fields, then, just to be consistent, set FRSH[j] to the logical OR of FRSH[j] and FRSHReceived[j] (;i.e., set FRSH[j] to TRUE if FRSHReceived[j] is TRUE) and proceed to the next third-party dataset (e.g.,j+1). Otherwise, if the client record lost no relevant conflict resolution to the GUD record (which means that the GUD record did lose a relevant conflict resolution), then set FRSH[j] to FRSHReceived[j] and proceed to the next third-party dataset (e.g.,j+1). Otherwise, given that the GUD record must have lost no relevant conflict resolution to the received record, make no change; i.e., keep FRSH[j] equal to FRSH[j]. If, after executing the procedure, the value of FRSH[j] differs from its corresponding FRSHReceived[j] for any third-party dataset j, then the client record is considered to have lost a conflict. Note that if FRSH[j] and FRSHReceived[j] are initially not identical, then they are considered to be in conflict, and one of them will be considered to be the winner, depending on the result of the procedure. Note that when any entry in the mapping table for any client j was first created, the freshness flag FRSH[j] was initially set to FALSE. The practical result of propagating third-party freshness indicators is that, when two party datasets are synchronized, information is exchanged such that each party dataset knows what versions of user data (or status information) the party dataset needs not send to particular third party datasets in any future synchronization.

6. Update Freshness Indicators for All Clients

If any user-data or status field of the received client record has lost a conflict resolution, then the GUD record is known to be fresh with respect to the client and FRSH[k] is set to TRUE, where k refers to the client.

For every third-party client j, if any mapped field of the GUD record was changed due to propagating the received client record, then the GUD record is known to be fresh with respect to the third-party datasets j and the synchronizer sets FRSH[j] to TRUE. Note that if the third-party client j is also a synchronizer, then all user-data fields, as well as many status fields (including, for example, mappings, last-synchronization times, and freshness indicators) are preferably considered to be mapped to the third-party client j. Thus, for such a third-party client synchronizer j, FRSH[j] is set to TRUE even if only one of the mapped status fields (e.g., a last-synchronization time) has changed.

F. Resolve Duplicates, e.g., Intelligently to Minimize Subsequent Disruptions After the propagation step 715, the synchronizer in the step 720 performs any further duplicate resolution. In particular, if the GUD record that corresponds to the received client record now is equivalent to another GUD record (e.g., has the same values in certain uniqueness-giving key fields), then the synchronizer detects a duplication. To resolve the duplication, the synchronizer designates one of the equivalent records as the "losing record" and merges it into the other GUD record (the "winning record"), subject to conflict resolution as described above. The synchronizer then deletes the losing record. By the synchronizer's deleting the losing record, the losing record becomes fresh with respect to all mapped counterparts in other datasets, and the synchronizer sets the deleted losing record's FRSH[j] status field to TRUE for all of the losing record's mapped datasets j. In the preferred embodiment, user-data fields and their directly-associated status fields are propagated from the losing record into the winning record, subject to conflict resolution (e.g., do not overwrite later information with earlier). The directly-associated status fields are generally status fields not in the mapping tables, including for example $T_{MOD}$, $T_{PRI}$, and $C_{PRI}$. Further, in the preferred embodiment, third-party record mappings (e.g., $ID_{EXT}$) and last-synchronization times (e.g., $T_{SYNC}$) of the losing record are preferably not propagated into the winning record, for simplicity. (In an alternative embodiment, record mappings and last-synchronization times of the losing record are propagated using conflict resolution into the winning record.) The synchronizer sets the freshness indicator FRSH[k] for the client dataset k to TRUE if any user-data or status field of the winning record has lost a conflict resolution with the losing record. The synchronizer updates the freshness indicator FRSH[j] for all third-party dataset j, as described above, in a manner that treats the losing record as if it were an update to the winning record received from the client dataset k.

In the step 720, according to an aspect of the present invention, the synchronizer designates as the winning record the duplicate record that is already mapped to records in more third-party datasets than is the other duplicate record. This approach, which is indicated in FIG. 7A at the label 737, attempts to minimize the amount of disruption to third-party clients (i.e., the amount of work that must be done in subsequent synchronizations involving third-party clients). For example, if a first record, mapped to two other datasets, is duplicative of a second record, mapped to three other datasets, then deleting the first record will cause the deletion to be propagated to only the two other datasets, whereas deleting the second record will cause the deletion to be propagated to the three other datasets. Therefore, in the example, the first record is the loser.

G. Send Changes to Client, also with Other-context Information

In the step 723, the synchronizer sends to the client synchronizer all changes in the list of third-party clients known to the GUD. These changes are to be propagated into the client synchronizer. The synchronizer also sends to the client synchronizer all changes to the record-field mappings with regard to all clients. By the step 723, the client and the GUD will be synchronized in their client lists and in their record-field mappings.

In the step 725, the synchronizer sends to the client k all GUD records that are fresh with respect to the client k (e.g., all GUD records having a value of TRUE in the FRSH[k] status field). If the client is another synchronizer, the sent GUD record includes other-context information, as indicated in FIG. 7A at the label 738, in the fashion described above in relation to the received client records. Once a fresh GUD record is successfully sent (e.g., confirmed as received), its FRSH[k] status field is set to FALSE.

X. Improve Circular Synchronization without Sharing 3rd-party Information

Figure 7B:
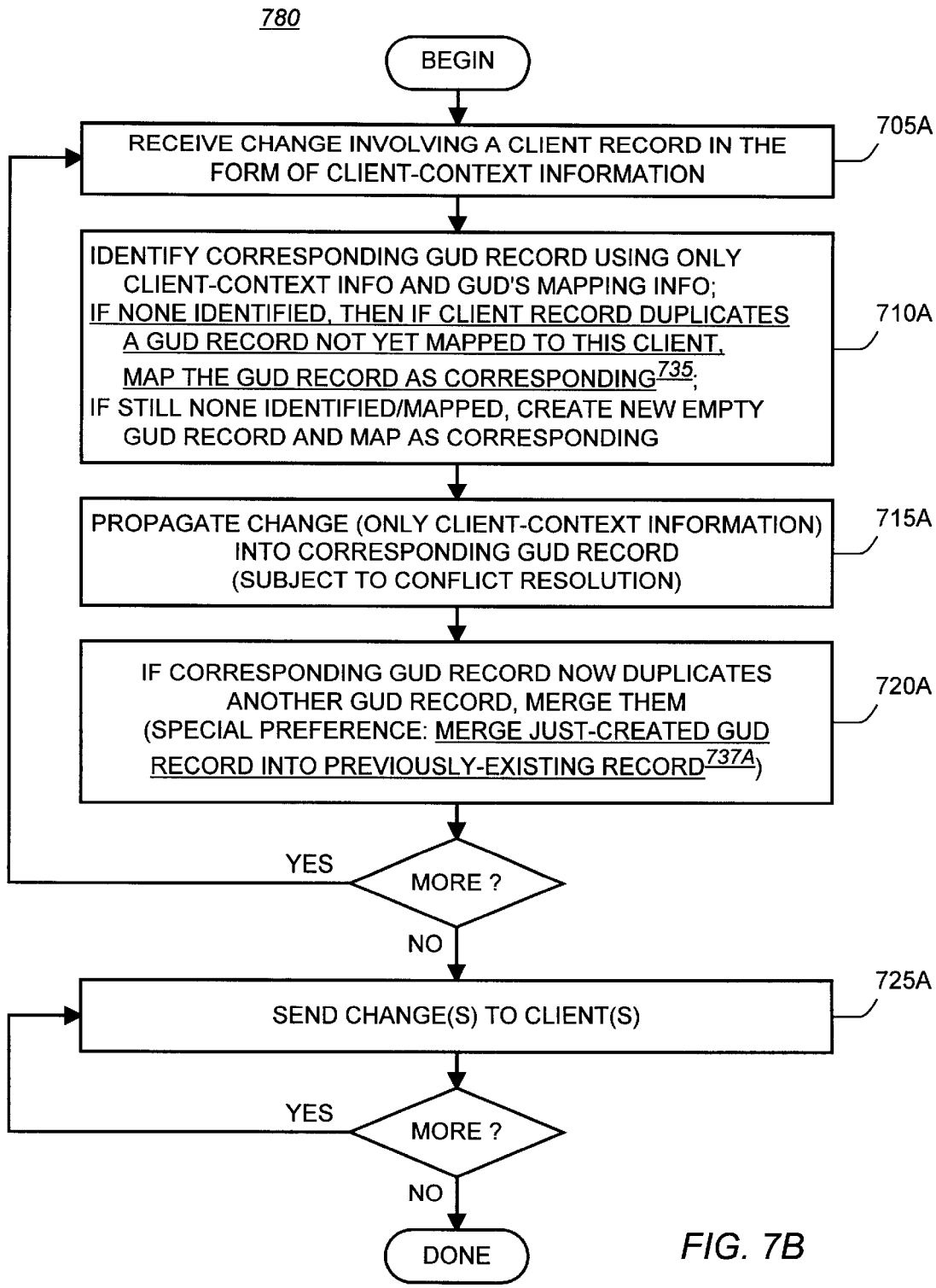
FIG. 7B is a flow chart that shows a synchronization method that includes enhanced duplicate resolution strategies for handling the circular synchronization situation according to an embodiment of the present invention.

FIG. 7B is a flow chart that shows a synchronization method that includes enhanced duplicate resolution strategies for handling the circular synchronization situation according to an embodiment of the present invention. FIG. 7B is essentially a re-drawing of FIG. 7A, with all steps or substeps involving communication or use of third-party information removed. As such, FIG. 7B is self-explanatory.

The method of FIG. 7B is useful either as an alternative, or as a complement, to the preferred method of FIGS. 5 and 7A. The method of FIG. 7B is especially useful for synchronizing with existing client datasets, e.g., non-GUD datasets, that cannot easily be upgraded to maintain or to communicate third-party status information.

XI. Example Synchronization Sequences without Sharing 3rd-party Information

A. Example 1: Receive a New Record and its Mapping to a New Context

FIGS. 8A and 8B form a table 800 that depicts the first example sequence of synchronizations of FIG. 6A, including possible results of using only the synchronization method of FIG. 7B according to the present invention or of not using the enhancements of the method of FIG. 7B. In particular, the table 800 depicts results of synchronizing circularly without sharing third-party information during synchronization. The table 800 includes rows 603, 605, 607 (shown twice), 611A, 611B, 611C, and 611D, which will be described below.

The rows 603, 605, 607 are the same as appear in FIG. 6A, and need not be described again in detail. It is sufficient to summarize that after time T3, as shown in row 607 in FIG. 8B, the user data of all three datasets A, B, and C are already in a synchronized state. However, because the GUD C has not directly synchronized with the dataset A, it has not already mapped its record C5 to the record A3 in the dataset A. At the time T4, the user uses the server-based synchronizer to directly synchronize the GUD C and the handheld dataset A.

The rows 611A, 611B, 611C illustrate possible results after the time T4 for a synchronizer that does not use the enhancements of the present invention as shown in FIG. 7B. In particular, the synchronizer does not use duplicate resolution to directly establish a mapping between a received "newly-added" record from the client and an existing GUD record. Instead, the synchronizer simply adds a new GUD record and only thereafter determines whether the newly added GUD record duplicates another GUD record. If the newly-added GUD record does duplicate another record, the synchronizer merges one of the duplicates into the other by somehow choosing a winner. In the row 611A, a result is shown in which the duplicate resolution fails completely, and two mutually-duplicative records exist in each of the datasets A and C. In the row 611B, a result is shown in which the a duplication of GUD records is caused and detected and the record C5 "wins" a resolution of the detected duplication such that the newly-created GUD record is merged into the record C5. Because the newly-created GUD record is subsequently deleted, the record A3 is also deleted by the synchronization. A new record A6 is created in the dataset A to correspond to the record C5. Thus, the record ID of the record A3 has effectively been changed, and mapping information in the third-party dataset B is made, in a sense, obsolete. Thus, the seeds are sown for a potentially never-ending cycle of useless activity in subsequent synchronizations involving the third-party dataset B. In the row 611C, a similar result is shown in which the record A3 "wins" a duplicate resolution and the record ID of the record C5 is effectively changed, to C7, to thereby make possible a potentially never-ending cycle of useless activity in subsequent synchronizations involving the third-party dataset B.

The row 611D shows the result of using the method of FIG. 7B, of the present invention, to use duplicate resolution to directly establish a mapping between a received "newly-added" record from the client and an existing GUD record. As shown, an nearly optimal result is achieved. In particular, note that the result shown in the row 611D is essentially identical to the result obtained even with sharing of third-party information, as shown at the row 613 of FIG. 6A.

B. Example 2: Map Unmapped Pre-existing Records

FIGS. 8C and 8D form a table 830 that depicts the second example sequence of synchronizations of FIG. 6B, including possible results of using only the synchronization method of FIG. 7B according to the present invention or of not using the enhancements of the method of FIG. 7B. In particular, the table 830 depicts results of synchronizing circularly without sharing third-party information during synchronization. The table 830 includes rows 633, 635, 637 (shown twice), 639A, 639B, 639C, and 639D. The rows 633, 635, 637 are the same as appear in FIG. 6B, and need not be described again in detail. In light of the previous discussion, the remainder of the table 830 of FIGS. 8C and 8D is self-explanatory. Essentially, by using enhanced duplicate resolution according to FIG. 7C, to directly establish a mapping between a received "newly-added" record from the client and an existing GUD record, an optimal result is achieved. This optimal result is shown at the row 639D. Without using the enhanced duplicate resolution according to FIG. 7C to directly establish a mapping between a received "newly-added" record from the client and an existing GUD record, sub-optimal results will be achieved. These sub-optimal results are shown at the rows 639A, 639B, 639C.

While the invention is described in some detail with specific reference to a single, preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method for synchronizing multiple datasets in a synchronization system, the system comprising a first synchronizer, a second synchronizer, a first dataset, a second dataset and a third dataset, wherein a new entry has been made to a first record in the first dataset, the method comprising:

synchronizing the first dataset with the second dataset using the first synchronizer, including propagating the new entry to a corresponding second record in the second dataset and storing information mapping the first record in the first dataset to the corresponding second record in the second dataset;

synchronizing the first dataset with the third dataset using the second synchronizer, including propagating the new entry to a corresponding third record in the third dataset and storing information mapping the first record in the first dataset to the corresponding third record in the third dataset;

communicating mapping information regarding the first record between the first synchronizer and the second synchronizer; and using the mapping information between the first and second records and between the first and third records to determine that the second and third records should be mapped together.

2. The method of claim 1, wherein each of the first synchronizer, the second synchronizer, the first dataset, the second dataset and the third dataset is on a separate data product.

3. The method of claim 1, wherein the first synchronizer communicates to the second synchronizer, information mapping the first record in the first dataset to the corresponding second record in the second dataset, and the second synchronizer uses this mapping information to determine that the second and third records should be mapped together.

4. The method of claim 1, wherein the step of communicating the mapping information occurs during a synchronization between the second and third datasets.

5. The method of claim 4, wherein the second dataset is a reference dataset for the first synchronizer and the third dataset is a reference dataset for the second synchronizer.

6. The method of claim 4, wherein the synchronization between the second and third datasets is performed by the first synchronizer.

7. A method for synchronizing multiple datasets in a synchronization system, the synchronization system comprising a first and a second synchronizer and a plurality of datasets, wherein a user has made a first change in a first dataset, the method comprising:

synchronizing a first and a second dataset using the first synchronizer, so that the first synchronizer becomes aware of the first change and propagates the first change to the second dataset;

synchronizing the second and a third dataset so that the first change is propagated from the second dataset to the third dataset;

communicating from the first synchronizer to the second synchronizer that the first change has been made to the first dataset; and synchronizing the first and third datasets using the second synchronizer, wherein the second synchronizer does not send the first change from the third dataset to the first dataset because the second synchronizer is aware that the first change has already been made to the first dataset.

8. The method of claim 7, wherein the step of communicating from the first synchronizer to the second synchronizer occurs during the synchronization between the second and third datasets.

9. The method of claim 8, wherein the second dataset is a reference dataset for the first synchronizer and the third dataset is a reference dataset for the second synchronizer.

10. A synchronization system for synchronizing multiple datasets, the system comprising:

a plurality of datasets to be synchronized with one another, the plurality of datasets residing on one or more data products;

a first synchronizer for synchronizing one or more of said datasets; and a second synchronizer for synchronizing one or more of said datasets, wherein said first synchronizer receives a first change from a first one of said plurality of datasets during a first synchronization, said first synchronizer subsequently communicates said first change to said second synchronizer, and said second synchronizer subsequently sends said first change to a second of said plurality of datasets during a second synchronization.

11. The system of claim 10, wherein the first synchronizer is implemented on a personal computer and the second synchronizer is implemented on a first server computer.

12. The system of claim 11, wherein the second dataset is also implemented on a server computer.

13. The system of claim 12, wherein the first dataset is implemented on a handheld device that may be intermittently connected to said personal computer.

14. The system of claim 13, wherein the second dataset is implemented on the first server computer.

15. The system of claim 14, wherein the handheld device may also be intermittently connected to the first server computer by a wireless communication link.

16. A method for synchronizing multiple datasets in a synchronization system, the system comprising a first synchronizer having a first reference dataset, a second synchronizer having a second reference dataset, and a third dataset, the method comprising:

synchronizing said first reference dataset with said second reference dataset, and communicating from said first synchronizer to said second synchronizer status information about said third dataset; and synchronizing said third dataset using said second synchronizer, said second synchronizer using said status information about said third dataset during the synchronization.

17. The method claim 16, wherein said status information comprises mapping information related to records in said third dataset.

18. The method claim 16, wherein said status information comprises a timestamp related to a record in said third dataset.

19. The method of claim 18, wherein said timestamp is made by a real-time clock.

20. The method of claim 18, wherein said timestamp comprises a change counter value.

21. A method for synchronizing multiple datasets in a synchronization system, the system comprising a first and a second synchronizer and a first dataset, the method comprising:

synchronizing the first dataset using the first synchronizer, including synchronizing a first change with the first dataset;

communicating from the first synchronizer to the second synchronizer that the first change was synchronized with the first dataset; and synchronizing the first dataset using the second synchronizer, wherein the second synchronizer does not synchronize the first change with the first dataset because the second synchronizer is aware that the first change has already been synchronized with the first dataset.

22. The method of claim 21, wherein the step of communicating from the first synchronizer to the second synchronizer is performed during a synchronization involving a first reference dataset associated with the first synchronizer and a second reference dataset associated with the second synchronizer.

23. The method of claim 22, wherein the synchronization involving said first reference dataset and said second reference dataset additionally involves a third dataset.

24. A synchronization system for synchronizing multiple datasets, the system comprising:

a plurality of datasets to be synchronized with one another, the plurality of datasets residing on one or more data products;

a first synchronizer for synchronizing one or more of said datasets; and a second synchronizer for synchronizing one or more of said datasets, wherein the first synchronizer performs a first synchronization with one or more of said plurality of datasets, said first synchronizer subsequently communicates information relative to said first synchronization to said second synchronizer, and said second synchronizer subsequently uses said information relative to said first synchronization during another synchronization with one or more of said plurality of datasets.

25. The method of claim 24, wherein said communication from said first synchronizer to said second synchronizer occurs during a second synchronization involving both said first and second synchronizers.

26. The method of claim 25, wherein the first synchronization involves a first dataset and a second dataset, the second synchronization involves the second dataset and a third dataset and the another synchronization involves the first dataset and the third dataset.

27. A method for synchronizing multiple datasets in a synchronization system, the system comprising a first synchronizer, a second synchronizer and a first dataset, the first dataset having a first record, the first synchronizer maintaining a first status field for indicating the last synchronization time of the first record by the first synchronizer, the second synchronizer maintaining a second status field for indicating the last synchronization time of the first record by the second synchronizer, wherein a first change has been made to the first record in the first dataset, the method comprising:

the first synchronizer synchronizing the first dataset, so that the first dataset sends the first change to the first synchronizer and the first synchronizer updates the first status field based on the time of the synchronization;

the first synchronizer communicating to the second synchronizer the first change and the contents of the first status field; and the second synchronizer storing the contents of the first status field, as received from the first synchronizer, into the second status field, and using the new contents of the second status field as the last synchronization time of the first record by the second synchronizer for a subsequent synchronization.

28. The method of claim 27, wherein the contents of the first and second status fields comprise a timestamp.

29. The method of claim 28, wherein the timestamp is made by a real-time clock.

30. The method of claim 28, wherein the timestamp comprises a change counter value.

31. A method for synchronizing multiple datasets in a synchronization system, the system comprising a first synchronizer, a second synchronizer and a first dataset, the first dataset having a first record, the first synchronizer maintaining a first status field for indicating a priority time of the first record, the second synchronizer maintaining a second status field for indicating the priority time of the first record, wherein a first change is made to the first record in the first dataset at a first priority time, the method comprising:

the first synchronizer synchronizing the first dataset, so that the first dataset sends the first change and the first priority time to the first synchronizer and the first synchronizer stores the first priority time in the first status field;

the first synchronizer communicating to the second synchronizer the first change and the contents of the first status field; and the second synchronizer storing the contents of the first status field, as received from the first synchronizer, into the second status field, and using the new contents of the second status field as the priority time of the first record for a subsequent synchronization.

* * * * *